(12) United States Patent
Taherzadeh Boroujeni et al.

(10) Patent No.: US 11,540,331 B2
(45) Date of Patent: Dec. 27, 2022

(54) TECHNIQUES FOR ADAPTING COMMUNICATION PROCEDURES BASED ON DEVICE CHARACTERISTICS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/143,973

(22) Filed: Jan. 7, 2021

(65) Prior Publication Data

US 2022/0217779 A1    Jul. 7, 2022

(51) Int. Cl.
| | |
|---|---|
| *H04W 74/08* | (2009.01) |
| *H04L 41/0654* | (2022.01) |
| *H04L 41/0803* | (2022.01) |
| *H04W 24/08* | (2009.01) |
| *H04W 56/00* | (2009.01) |
| *H04W 74/00* | (2009.01) |

(52) U.S. Cl.
CPC ..... *H04W 74/0833* (2013.01); *H04L 41/0654* (2013.01); *H04L 41/0803* (2013.01);
(Continued)

(58) Field of Classification Search
CPC . H04W 74/00; H04W 74/08; H04W 74/0833; H04W 56/00; H04W 56/001; H04W 56/0015; H04W 74/002; H04W 74/004; H04W 74/008; H04W 16/00; H04W 41/0813; H04W 41/0816;
(Continued)

(56) References Cited

U.S. PATENT DOCUMENTS

| | | | |
|---|---|---|---|
| 7,096,021 B1* | 8/2006 | Lehtinen | H04W 36/0094 455/442 |
| 2002/0082039 A1* | 6/2002 | Ue | H04W 52/265 455/13.4 |

(Continued)

FOREIGN PATENT DOCUMENTS

| | | |
|---|---|---|
| EP | 2292067 A1 | 3/2011 |
| EP | 3235300 A1 | 10/2017 |

(Continued)

OTHER PUBLICATIONS

International Search Report and Written Opinion—PCT/US2021/072278—ISA/EPO—dated Mar. 3, 2022.

*Primary Examiner* — Warner Wong
(74) *Attorney, Agent, or Firm* — Holland & Hart LLP

(57) ABSTRACT

Methods, systems, and devices for wireless communications are described. In some examples, a base station may select a profile from a set of profiles indicating a communication procedure and a measurement configuration based on one or more communication parameters associated with the base station and transmit an indication of the profile to a user equipment (UE). The UE may utilize the selected profile to modify the communication procedure for coverage enhancement. For example, if one or more conditions (e.g., signal threshold) of the measurement configuration are met, the UE may modify the communication procedure and communicate with the base station according to the modified communication procedure.

30 Claims, 15 Drawing Sheets

(52) U.S. Cl.
CPC ......... *H04W 24/08* (2013.01); *H04W 56/001* (2013.01); *H04W 74/002* (2013.01)

(58) Field of Classification Search
CPC ............... H04W 41/0823; H04L 41/06; H04L 41/0654; H04L 41/0672; H04L 41/08; H04L 41/0803; H04L 24/00; H04L 24/02; H04L 24/08; H04L 43/00; H04L 43/08
See application file for complete search history.

(56) References Cited

U.S. PATENT DOCUMENTS

| | | | |
|---|---|---|---|
| 2006/0002338 A1* | 1/2006 | Guo | H04W 52/267 370/328 |
| 2010/0323683 A1 | 12/2010 | Kazmi et al. | |
| 2011/0086658 A1* | 4/2011 | Baldemair | H04W 74/0833 455/507 |
| 2018/0115857 A1 | 4/2018 | Fukuta | |
| 2018/0184447 A1 | 6/2018 | Wang et al. | |
| 2018/0227030 A1* | 8/2018 | Chen | H04L 1/0027 |
| 2019/0075561 A1* | 3/2019 | Tang | H04W 72/0453 |
| 2019/0296954 A1* | 9/2019 | Xing | H04W 92/10 |
| 2020/0178133 A1* | 6/2020 | Chen | H04W 36/32 |
| 2020/0389282 A1* | 12/2020 | Turtinen | H04L 5/0092 |
| 2021/0218500 A1* | 7/2021 | Bhamri | H04L 1/189 |
| 2022/0030456 A1* | 1/2022 | Sundberg | H04L 5/1469 |

FOREIGN PATENT DOCUMENTS

| | | | | |
|---|---|---|---|---|
| GB | 2481715 | * | 4/2011 | ........... H04W 88/12 |
| WO | WO-2000074421 A1 | | 12/2000 | |
| WO | WO-2020034319 A1 | | 2/2020 | |
| WO | WO-2020046556 A1 | | 3/2020 | |

* cited by examiner

TECHNIQUES FOR ADAPTING COMMUNICATION PROCEDURES BASED ON DEVICE CHARACTERISTICS

FIELD OF TECHNOLOGY

The following relates to wireless communications, including techniques for adapting communication procedures based on device characteristics.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication system, UEs may modify communications with a base station for the purpose of coverage enhancement. In some cases, the UE may consider signal strength indicators to determine when coverage enhancement may be beneficial. Such techniques, however, may provide inaccurate estimates for the determination of whether coverage enhancement techniques may be beneficial as a measured signal strength at a UE (or other measured indicators) depend on a variety of factors.

SUMMARY

The described techniques relate to improved methods, systems, devices, and apparatuses that support techniques for adapting communication procedures based on device characteristics such as characteristics or parameters of a base station or a user equipment (UE). Generally, the described techniques provide for a UE to modify a communication procedure for coverage enhancement based on a profile that indicates the communication procedure along with a measurement configuration (e.g., a downlink configuration for downlink signals associated with the communication procedure). For example, a base station may select a profile from a set of profiles, and the profile may indicate the communication procedure for modification for coverage enhancement as well as the measurement configuration associated with the communication procedure. In some examples, the base station may select the profile based on its current communication parameters (e.g., antenna configuration). The base station may transmit an indication of the selected profile to the UE and the UE may utilize the profile to determine when and if the UE should modify the communication procedure for coverage enhancement. For example, the measurement configuration may include measurement criteria (e.g., signal strength thresholds) which, if satisfied, may trigger a modification to the communication procedure (e.g., triggering uplink signal repetition such as random access channel (RACH) repetition). By utilizing the profile, the UE may take into account base station communication parameters when determining to modify a communication procedure for coverage enhancement.

A method for wireless communications at a UE is described. The method may include receiving, from a base station, an indication of a profile based on one or more communication parameters of the base station, the profile indicating a communication procedure between the UE and the base station and a downlink measurement configuration for modification of the communication procedure for coverage enhancement at the UE, measuring one or more downlink signals from the base station, the one or more downlink signals indicated by the downlink measurement configuration, modifying the communication procedure based on measurements of the one or more downlink signals satisfying a threshold indicated by the downlink measurement configuration, and communicating with the base station according to the modified communication procedure for coverage enhancement at the UE based on the modifying.

An apparatus for wireless communications at a UE is described. The apparatus may include a processor, memory in electronic communication with the processor, and instructions stored in the memory. The instructions may be executable by the processor to cause the apparatus to receive, from a base station, an indication of a profile based on one or more communication parameters of the base station, the profile indicating a communication procedure between the UE and the base station and a downlink measurement configuration for modification of the communication procedure for coverage enhancement at the UE, measure one or more downlink signals from the base station, the one or more downlink signals indicated by the downlink measurement configuration, modify the communication procedure based on measurements of the one or more downlink signals satisfying a threshold indicated by the downlink measurement configuration, and communicate with the base station according to the modified communication procedure for coverage enhancement at the UE based on the modifying.

Another apparatus for wireless communications at a UE is described. The apparatus may include means for receiving, from a base station, an indication of a profile based on one or more communication parameters of the base station, the profile indicating a communication procedure between the UE and the base station and a downlink measurement configuration for modification of the communication procedure for coverage enhancement at the UE, means for measuring one or more downlink signals from the base station, the one or more downlink signals indicated by the downlink measurement configuration, means for modifying the communication procedure based on measurements of the one or more downlink signals satisfying a threshold indicated by the downlink measurement configuration, and means for communicating with the base station according to the modified communication procedure for coverage enhancement at the UE based on the modifying.

A non-transitory computer-readable medium storing code for wireless communications at a UE is described. The code may include instructions executable by a processor to receive, from a base station, an indication of a profile based on one or more communication parameters of the base station, the profile indicating a communication procedure between the UE and the base station and a downlink measurement configuration for modification of the communication procedure for coverage enhancement at the UE, measure one or more downlink signals from the base station, the one or more downlink signals indicated by the downlink measurement configuration, modify the communication procedure based on measurements of the one or more downlink signals satisfying a threshold indicated by the downlink measurement configuration, and communicate with the base station according to the modified communication procedure for coverage enhancement at the UE based on the modifying.

In some examples of the method, apparatuses, and non-transitory computer-readable medium described herein, modifying the communication procedure may include operations, features, means, or instructions for modifying a random access procedure based on the measurements of the one or more downlink signals satisfying the threshold indicated by the downlink measurement configuration.

Some examples of the method, apparatuses, and non-transitory computer-readable medium described herein may further include operations, features, means, or instructions for measuring the one or more signals of the synchronization signal block (SSB) indicated by the downlink measurement configuration, determining that measurements of the one or more signals of the SSB satisfies the signal threshold indicated by the downlink measurement configuration, and transmitting, to the base station, one or more repetitions of a RACH over a set of random access occasions based on the measurements of the one or more signals of the SSB satisfying the signal threshold.

Some examples of the method, apparatuses, and non-transitory computer-readable medium described herein may further include operations, features, means, or instructions for transmitting, to the base station, one or more uplink signals over a physical RACH according to the RACH type, the RACH format, or the RACH preamble subset indicated by the downlink measurement configuration, determining a set of resources for monitoring for a downlink control message that schedules a random access response message based on an association between the RACH type, the RACH format, or the RACH preamble subset indicated by the downlink measurement configuration and the set of resources, and monitoring the set of resources for the downlink control message.

In some examples of the method, apparatuses, and non-transitory computer-readable medium described herein, the downlink measurement configuration includes measurement criteria for activating an uplink control repetition procedure and the method, apparatuses, and non-transitory computer-readable medium may include further operations, features, means, or instructions for determining that the measurement criteria may be satisfied, activating the uplink control repetition procedure based on determining that the measurement criteria may be satisfied, and transmitting, to the base station, one or more repetitions of a physical uplink control channel (PUCCH) according to the uplink control repetition procedure.

In some examples of the method, apparatuses, and non-transitory computer-readable medium described herein, the downlink measurement configuration indicates a threshold number of beam failures for triggering a beam failure recovery (BFR) procedure and the method, apparatuses, and non-transitory computer-readable medium may include further operations, features, means, or instructions for determining that a number of beam failures at the UE exceeds the threshold number of beam failures indicated by the downlink measurement configuration and transmitting, to the base station, a beam failure recovery request as part of the beam failure recovery procedure based on the number of beam failures at the UE exceeding the threshold number of beam failures.

In some examples of the method, apparatuses, and non-transitory computer-readable medium described herein, receiving the indication of the profile may include operations, features, means, or instructions for receiving the indication of the profile via remaining minimum system information (RMSI), other system information (OSI), a physical broadcast channel (PBCH), a radio resource control (RRC) message, or a combination thereof.

Some examples of the method, apparatuses, and non-transitory computer-readable medium described herein may further include operations, features, means, or instructions for receiving, from the base station, a control message configuring the UE with a set of multiple profiles including the profile.

In some examples of the method, apparatuses, and non-transitory computer-readable medium described herein, the communication procedure includes a random access procedure, an initial access procedure, a re-establishment procedure, or a handover procedure.

In some examples of the method, apparatuses, and non-transitory computer-readable medium described herein, the downlink measurement configuration indicates the one or more downlink signals for measurement by the UE, a signal threshold associated with the one or more downlink signals, a channel type, a channel format, or a channel preamble subset.

In some examples of the method, apparatuses, and non-transitory computer-readable medium described herein, the one or more communication parameters includes an antenna arrangement, a transmission power, a mobility, a velocity, or a combination thereof associated with the base station.

A method for wireless communications at a base station is described. The method may include selecting, based on one or more communication parameters associated with the base station, a profile from a set of multiple profiles, the profile indicating a communication procedure between a UE and the base station and a downlink measurement configuration for modification of the communication procedure for coverage enhancement at the UE, transmitting, based on selecting the profile, an indication of the profile to the UE, the indication of the profile instructing the UE to modify the communication procedure based on the downlink measurement configuration, and communicating with the UE according to the modified communication procedure based on one or more measurements at the UE satisfying a threshold indicated by the downlink measurement configuration.

An apparatus for wireless communications at a base station is described. The apparatus may include a processor, memory in electronic communication with the processor, and instructions stored in the memory. The instructions may be executable by the processor to cause the apparatus to select, based on one or more communication parameters associated with the base station, a profile from a set of multiple profiles, the profile indicating a communication procedure between a UE and the base station and a downlink measurement configuration for modification of the communication procedure for coverage enhancement at the UE, transmit, based on selecting the profile, an indication of the profile to the UE, the indication of the profile instructing the UE to modify the communication procedure based on the downlink measurement configuration, and communicate with the UE according to the modified communication procedure based on one or more measurements at the UE satisfying a threshold indicated by the downlink measurement configuration.

Another apparatus for wireless communications at a base station is described. The apparatus may include means for selecting, based on one or more communication parameters associated with the base station, a profile from a set of multiple profiles, the profile indicating a communication procedure between a UE and the base station and a downlink measurement configuration for modification of the communication procedure for coverage enhancement at the UE, means for transmitting, based on selecting the profile, an indication of the profile to the UE, the indication of the profile instructing the UE to modify the communication procedure based on the downlink measurement configuration, and means for communicating with the UE according to the modified communication procedure based on one or more measurements at the UE satisfying a threshold indicated by the downlink measurement configuration.

A non-transitory computer-readable medium storing code for wireless communications at a base station is described. The code may include instructions executable by a processor to select, based on one or more communication parameters associated with the base station, a profile from a set of multiple profiles, the profile indicating a communication procedure between a UE and the base station and a downlink measurement configuration for modification of the communication procedure for coverage enhancement at the UE, transmit, based on selecting the profile, an indication of the profile to the UE, the indication of the profile instructing the UE to modify the communication procedure based on the downlink measurement configuration, and communicate with the UE according to the modified communication procedure based on one or more measurements at the UE satisfying a threshold indicated by the downlink measurement configuration.

In some examples of the method, apparatuses, and non-transitory computer-readable medium described herein, transmitting the indication may include operations, features, means, or instructions for transmitting the indication of the profile to the UE, the indication of the profile instructing the UE to modify a random access procedure based on the downlink measurement configuration and in accordance with the profile.

In some examples of the method, apparatuses, and non-transitory computer-readable medium described herein, the downlink measurement configuration indicates one or more signals of an SSB to measure and a signal threshold associated with the one or more signals of the SSB and the method, apparatuses, and non-transitory computer-readable medium may include further operations, features, means, or instructions for transmitting, to the UE, one or more signals of the SSB and monitoring for a set of RACHs including a RACH repetition over a set of multiple RACH occasions based on the profile, where monitoring includes monitoring a first number of symbols for one or more RACH signals based on the modified communication procedure, the first number of symbols different from a second number of symbols associated with the communication procedure.

In some examples of the method, apparatuses, and non-transitory computer-readable medium described herein, the downlink measurement configuration indicates a RACH type and the method, apparatuses, and non-transitory computer-readable medium may include further operations, features, means, or instructions for receiving, from the UE, one or more uplink signals over a physical RACH according to the RACH type, the RACH format, or the RACH preamble subset indicated by the downlink measurement configuration, determining a set of resources for downlink control information that schedules a random access response based on an association between the RACH type, the RACH format, or the RACH preamble subset indicated by the downlink measurement configuration and the set of resources, and transmitting, to the UE, downlink control information over the set of resources.

In some examples of the method, apparatuses, and non-transitory computer-readable medium described herein, the downlink measurement configuration indicates measurement criteria for activating an uplink control repetition procedure and the method, apparatuses, and non-transitory computer-readable medium may include further operations, features, means, or instructions for monitoring for one or more repetitions of a PUCCH according to the uplink control repetition procedure.

In some examples of the method, apparatuses, and non-transitory computer-readable medium described herein, the downlink measurement configuration indicates a threshold number of beam failures for triggering a BFR procedure and the method, apparatuses, and non-transitory computer-readable medium may include further operations, features, means, or instructions for monitoring for a BFR request according to the BFR procedure.

In some examples of the method, apparatuses, and non-transitory computer-readable medium described herein, transmitting the indication of the profile may include operations, features, means, or instructions for transmitting the indication of the profile via RMSI, OSI, a PBCH, an RRC message, or a combination thereof.

Some examples of the method, apparatuses, and non-transitory computer-readable medium described herein may further include operations, features, means, or instructions for transmitting, to the UE, a control message configuring the UE with the set of multiple profiles including the profile.

In some examples of the method, apparatuses, and non-transitory computer-readable medium described herein, the communication procedure includes a random access procedure, an initial access procedure, a re-establishment procedure, or a handover procedure.

In some examples of the method, apparatuses, and non-transitory computer-readable medium described herein, the downlink measurement configuration indicates one or more downlink signals for measurement by the UE, a signal threshold associated with the one or more downlink signals, a channel type, a channel format, or a channel preamble subset.

In some examples of the method, apparatuses, and non-transitory computer-readable medium described herein, the one or more communication parameters includes an antenna arrangement, a transmission power, a mobility, a velocity, or a combination thereof associated with the base station.

DETAILED DESCRIPTION

Figure 1:
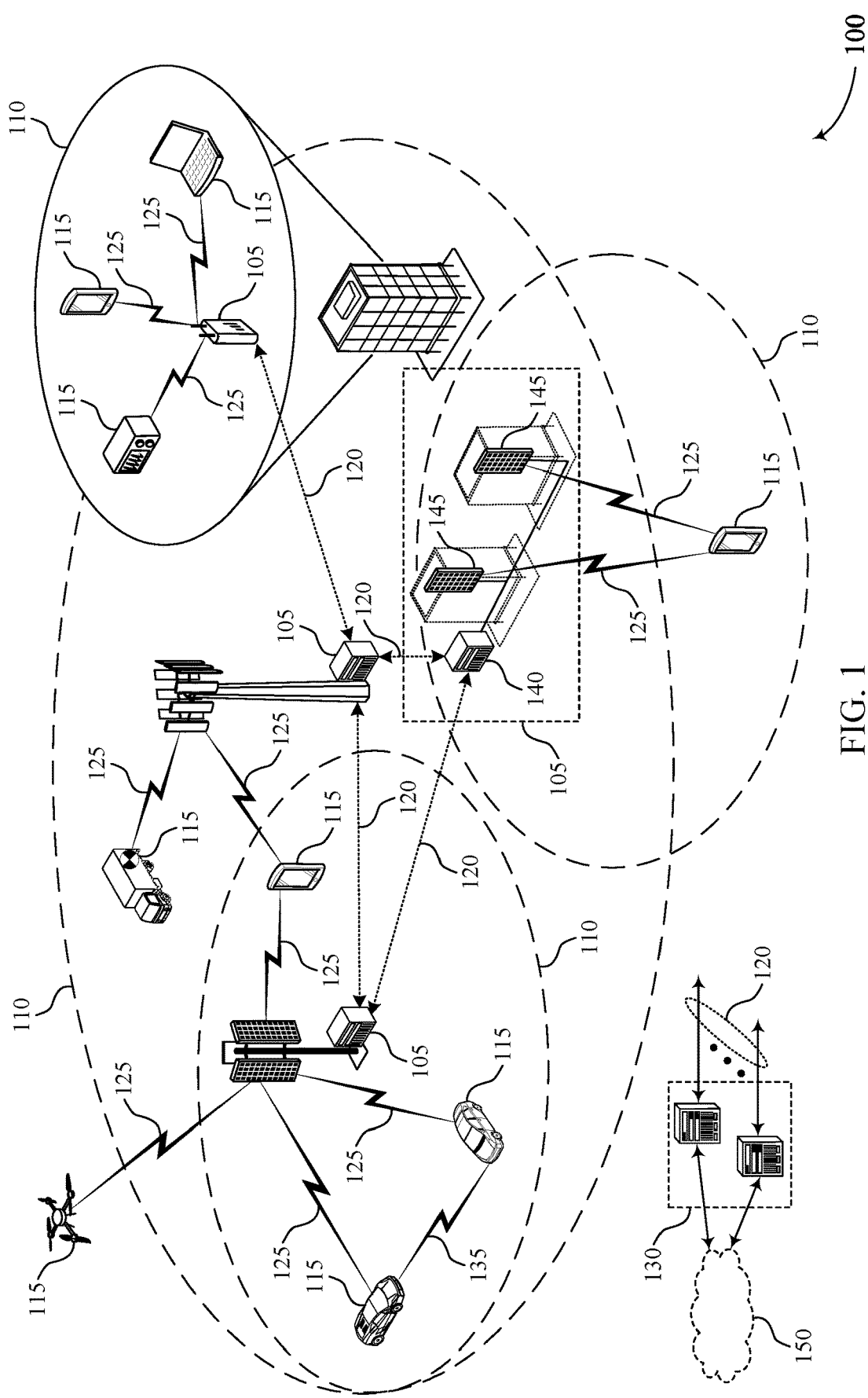
FIGS. 1 and 2 illustrate examples of wireless communications systems that support techniques for adapting communication procedures based on device characteristics in accordance with aspects of the present disclosure.

In some wireless communications systems, different channels or signals utilized during uplink procedures may require coverage enhancement (e.g., in frequency range 2 (FR2)). In one case, resources for coverage enhancement may be allocated to all user equipment (UEs) within a cell. However, allocating resources for coverage enhancement to all UEs may be inefficient and may result in coverage enhancement techniques being overutilized by UEs that have adequate coverage. In cases where coverage enhancement is specific to each UE of a cell (e.g., a UE may first determine if it may benefit from coverage enhancement and carry out uplink procedures based on the determination), the UE may not consider characteristics of the base station (e.g., antenna arrangement, transmit power, etc.) when determining whether it may benefit from coverage enhancement. As such, the wireless communications system may configure different criteria for activating coverage enhancement at the UEs based on the properties of the base station and indicating this criteria to the UEs may result in an increase in signaling (e.g., extra fields in system information or other signaling).

In some examples, a UE may utilize a profile indicating a communication procedure and measurement configuration for performing a coverage enhancement technique, where the profile is based on communication parameters of a base station. The base station may select a profile from a set of profiles that may be predefined, preconfigured, or part of a communication standard. The base station may select the profile based on its current communication parameters (e.g., transmit power or antenna configuration) and transmit an indication of the profile to the UE. In some examples, the UE may identify or may be configured with a set of profiles including the selected profile. The UE may receive the indication of the profile and utilize the indicated profile to perform the communication procedure based on the measurement configuration indicated in the profile. In some examples, the communication procedure may be a random access channel (RACH) procedure and the profile may include one or more thresholds related to synchronization signal block (SSB) measurements which, if satisfied, may trigger a modified RACH procedure such as performing RACH repetitions over multiple RACH occasions. Such modifications to communication procedures may enhance coverage, an result in a higher likelihood of successful communications, among other benefits. The communication procedure may also include other communication procedures such as connection reestablishment or procedures performed after a RACH procedure such as a beam failure recovery (BFR) procedure, which may be modified based on the measurement configuration indicated in a profile for coverage enhancement. By taking into account base station communication parameters through the use of a profile, the UE may accurately determine when to modify a communication procedure and when coverage enhancement may be beneficial. According to aspects herein, UEs within a cell may efficiently utilize resources and reduce overhead signaling.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to techniques for adapting communication procedures based on device characteristics.

FIG. 1 illustrates an example of a wireless communications system 100 that supports techniques for adapting communication procedures based on device characteristics in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may utilize a profile indicating a relationship between a communication procedure and a measurement configuration to modify the communication procedure using coverage enhancement techniques. For example, a base station 105 may select a profile from a set of profiles indicating a communication procedure to modify for coverage enhancement as well as a measurement configuration. In some examples, the base station 105 may select the profile based on its current communication parameters (e.g., antenna configuration). The base station 105 may transmit an indication of the selected profile to a UE 115 and the UE 115 may utilize the profile to determine when and if the UE 115 should modify the communication procedure for coverage enhancement. For example, the measurement configuration may include measurement criteria (e.g., signal strength thresholds) which, if satisfied, may trigger a modification to the communication procedure (e.g., triggering RACH repetition). By utilizing the profile, the UE 115 may take into the base station 105 communication parameters when determining to modify a communication procedure for coverage enhancement.

Figure 2:
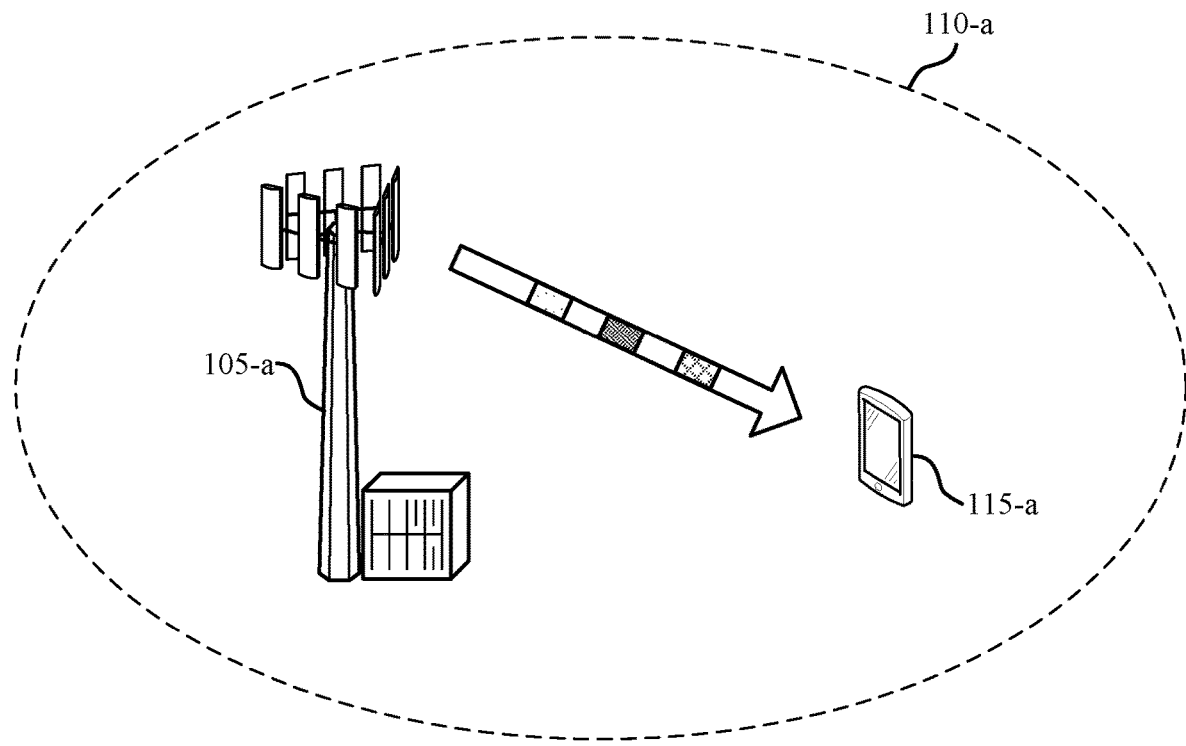

FIG. 2 illustrates an example of a wireless communications system 200 that supports techniques for adapting communication procedures based on device characteristics in accordance with aspects of the present disclosure. In some examples, the wireless communications system 200 may implement aspects of a wireless communications system 100. For example, the wireless communications system 200 may include a base station 105-a and a UE 115-a, which may be examples of a base station 105 and a UE 115 with reference to FIG. 1. In some examples, base station 105-a and UE 115-a may be located within coverage area 110-a.

In some examples, the wireless communications system 200 may utilize multiple communication procedures. For example, the UE 115-a may utilize a random access channel (RACH) procedure as part of a radio resource control (RRC) establishment procedure (e.g., contention-based procedure) or a handover procedure (e.g., non-contention-based procedure). The UE 115-a may undergo a RACH procedure when the UE 115-a has not been allocated resources for transmitting a scheduling request to the base station 105-a. Before initiating the RACH procedure, the UE 115-a may receive system information from the base station 105-a informing the UE 115-a on how to generate or select a physical RACH (PRACH) preamble and when to transmit RACH (e.g., RACH occasion). During the RACH procedure, the UE 115-a may generate the RACH preamble and transmit the RACH preamble to the base station 105-a during the RACH occasion. The PRACH preamble may distinguish the UE 115-a from other UEs in the coverage area 110-a. In some examples, the UE 115-a may randomly choose a preamble from a preconfigured set of preambles or the base station 105-a may allocate a preamble to the UE 115-a. The base station 105-a may then transmit a random access response. The random access response includes information such as a preamble index, an uplink grant, a timing advance, etc. In response, the UE 115-a may transmit either an RRC connection reconfiguration complete message (e.g., in a non-contention based procedure) or an RRC connection request (e.g., in a contention-based procedure).

Using different techniques, the UE 115-a may allocate resources or adapt a communication procedure for communication between the UE 115-a and the base station 105-a for coverage enhancement. In some examples, the base station 105-a may configure all UEs within coverage area 110-a for coverage enhancement. However, not all UEs within coverage area 110-a may benefit from coverage enhancement, which may result in an inefficient use of resources. In another example, UEs within coverage area 110-a may determine whether they may benefit from coverage enhancement by performing SSB-based measurements. That is, the UE 115-a may measure one or more signals of an SSB (e.g., primary synchronization signal (PSS), secondary synchronization signal (SSS), physical broadcast channel (PBCH), or a demodulation reference signal (DMRS)) and determine whether it may benefit from coverage enhancement. For example, the UE 115-a may calculate a reference signal received power (RSRP) value of the one or more signals of the SSB and if the RSRP value falls below a preconfigured threshold, the UE 115-a may benefit from coverage enhancement. As such, the UE 115-a may modify one or more communication procedures for coverage enhancement. However, using these techniques, communication parameters or other parameters of the base station 105-a may not be taken into account. In some examples, determining whether the UE 115-a may benefit from coverage enhancement may rely on the communication parameters or characteristics of the base station 105-a. For example, the transmit power of the base station 105-a may be relatively low which may indicate a poor uplink/downlink channel quality at a UE 115-a. Without this information, however, the UE 115-a may incorrectly determine uplink/downlink channel quality and as a result, may incorrectly identify the benefit of coverage enhancement (e.g., by only utilizing RSRP of SSB signals) and apply a modified procedure. That is, the UE 115-a may have suitable coverage by the base station 105-a, but based on measurements performed by the UE 115-a, without additional information related to the base station 105-a taken into consideration, the UE 115-a may apply coverage enhancement). Other examples of communication parameters of base station 105-a which may indicate downlink/uplink channel quality may be mobility parameters such as the speed and direction in which the base station 105-a is traveling. However, providing this information (e.g., indication of communication parameters of the base station 105-a) may increase signaling which may in turn result in an increase in power consumption at the UE in terms of processing the signals as well as increased signaling overhead.

In accordance with aspects of the current disclosure, the UE 115-a may modify one or more communication procedures based on a profile indicating relationships between one or more communication procedures and one or more downlink measurement configurations. In some examples, the base station 105-a may configure the UE 115-a with a set of profiles, where each profile corresponds to a combination of communication parameters of the base station 105-a. Examples of communication parameters of the base station 105-a may be an antenna arrangement, a transmission power, a mobility, or a velocity associated with the base station 105-a. For example, the base station 105-a may transmit a control message 215 configuring the UE 115-a with the set of profiles. In some examples, the base station 105-a may select a profile from the set of profiles based on its current communication parameters (e.g., current velocity, current antenna arrangement, etc.) and transmit an indication of the selected profile via profile indication 205 to the UE 115-a. In some examples, the profile indication 205 may include two or three bits indicating the selected profile. In response, the UE 115-a may utilize the profile selected by the base station 105-a from the set of configured profiles and determine whether to modify the communication procedure indicated in the selected profile. The UE 115-a may determine whether to modify the communication procedure using the measurement configuration included in the selected profile. The measurement configuration may include criteria such as a type of downlink signal to measure (e.g., one or more signals of an SSB), a signal threshold associated with the downlink signal (e.g., a RSRP threshold or a received signal strength indicator (RSSI) threshold), a channel transmission type (e.g., a selected PRACH transmission type), a channel transmission format (e.g., a selected PRACH transmission format), or a channel transmission preamble subset (e.g., a selected subset of PRACH preambles from a set of configured preambles). If one or more of the criteria of the measurement configuration is met, the UE 115-a may determine to modify (e.g., update) the communication procedure and communicate with the base station 105-a according to the modified communication procedure.

In some examples, the UE 115-a may modify a RACH procedure for the purpose of coverage enhancement based on a profile indicating a RACH procedure and a measurement configuration. In such example, the UE 115-a may receive a profile indication 205 from the base station 105-a. The profile indication 205 may be transmitted via remaining minimum system information (RMSI), other system information (OSI), or PBCH. In one example, the profile indication 205 may point to a profile of a set of profiles configured at the UE 115-a which includes criteria for SSB measurements to trigger PRACH repetitions over multiple RACH occasions. For example, the profile may indicate a signal strength threshold (e.g., RSRP threshold or RSSI threshold) associated with one or more signals of the SSB. In such example, the UE 115-a may receive one or more downlink signals 210 (e.g., SSS, PSS, PBCH, or DMRS) from the base station 105-a, measure the one or more downlink signals 210, and calculate a signal strength value (e.g., RSRP values or RSSI value) associated with the one or more downlink signals 210. If the signal strength value does not satisfy the signal strength threshold indicated in the profile, the UE 115-a may activate PRACH repetition over multiple RACH occasions. Triggering PRACH repetition may allow the UE 115-a to retransmit one or more random access preambles until a random access response is successfully received at the UE 115-a thereby enhancing coverage. Additionally or alternatively, the profile indication 205 may point to a profile of the set of profile indicating a relationship between one or more of a selected PRACH transmission type, format, or preamble subset and a procedure for monitoring for downlink control information (DCI), where the DCI schedules a random access response (e.g., Msg2). In some examples, the profile may indicate a set of resources (e.g., time or frequency resources) to monitor for DCI based on a specified PRACH transmission type, format, or preamble subset. For example, the UE 115-a may transmit PRACH to the base station 105-a according to a first format specified in the system information (e.g., SIB2). In such example, the profile may indicate a relationship between the first format and a first set of resources for monitoring DCI. As such, the UE 115-a may switch from monitoring a second set of resources to monitoring the first set of resources. In some examples, the first set of resources may be a subset of the second set of resources.

In some examples, the UE 115-a may modify a communication procedure performed after a RACH procedure and while in an RRC-connected state. In such example, the UE 115-a may receive a profile indication 205 via RRC signaling. The profile indication 205 may convey a profile of a set of profile indicating criteria for activating (e.g., triggering) physical uplink control channel (PUCCH) repetitions. For example, the criteria may include a signal strength threshold (e.g., RSSI threshold or RSRP threshold) associated with one or more downlink signals. If a signal strength value of the one or more downlink signals does not satisfy the signal strength threshold indicated in the selected profile, the UE 115-a may activate PUCCH repetition. That is, the UE 115-a may transmit repetitions of a PUCCH transmission in a number of slots, where the number of slot is based on a PUCCH format (e.g., PUCCH format 1, 3, or 4). Alternatively or additionally, the profile indication 205 may indicate a profile of a set of profiles indicating criteria for triggering a BFR process. For example, the criteria may include a threshold associated with a number of beam failures. If the number of beam failures experienced by the UE 115-a satisfies the threshold, the BFR procedure may be triggered at the UE 115-a. That is, the UE 115-a select a candidate beam and perform a RACH procedure utilizing the selected candidate beam.

By configuring the UE 115-*a* with a set of profiles indicating a communication procedure and a downlink configuration, where each profile is based on communication characteristic of the base station 105-*a*, the UE 115-*a* may make an accurate determination to modify the communication procedure for coverage enhancement.

Figure 3:
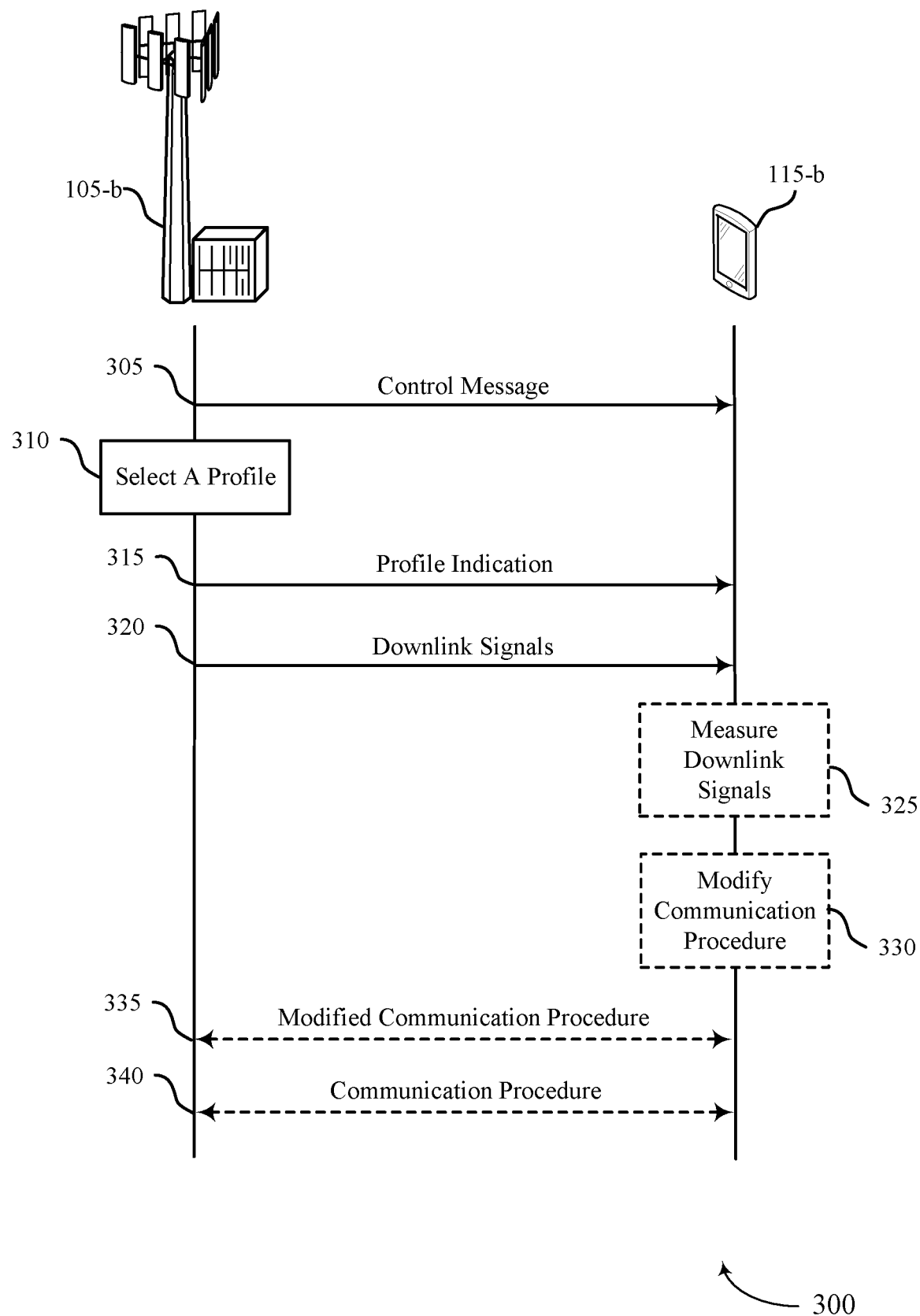
FIG. 3 illustrates an example of a process flow that supports techniques for adapting communication procedures based on device characteristics in accordance with aspects of the present disclosure.

FIG. 3 illustrates an example of a process flow 300 that supports techniques for adapting communication procedures based on device characteristics in accordance with aspects of the present disclosure. In some examples, the process flow 300 may implement aspects of a wireless communications system 100 and a wireless communications system 200. For example, the process flow 300 may include a base station 105-*b* and a UE 115-*b*, which may be examples of a base station 105 and a UE 115 with reference to FIGS. 1 and 2. The process flow 300 may involve the UE 115-*b* modifying a communication procedure based on a profile indicating the communication procedure and a measurement configuration, where the profile is determined based on communication parameters associated with the base station 105-*b*. Alternative examples of the following may be implemented, where some steps are performed in a different order than described or are not performed at all. In some cases, steps may include additional features not mentioned below, or further steps may be added.

At 305, the base station 105-*b* may transmit a control message to the UE 115-*b*. The control message may configure the UE 115-*b* with a set of profiles. Each profile may indicate a communication procedure and a measurement configuration and may be based on one or more communication parameters of the base station 105-*b* (e.g., antenna arrangement, transmission power, mobility, velocity, etc.). In some examples, the communication procedure may include a RACH procedure, an initial access procedure, a handover procedure, a re-establishment procedure, etc. and the measurement configuration may include one or more of an indication of a type of downlink signal to measure, a signal strength threshold associated with the downlink signal, a channel transmission type, a channel transmission format, or a subset of preambles from a set of preambles configured at the UE 115-*b*. In some examples, the set of profiles may be in the form of a lookup table at the UE 115-*b*. In such example, each profile may correspond to an index indicating its location in the lookup table.

At 310, the base station 105-*b* may select a profile from the set of profiles. In some examples, the base station may select the profile based on its current communication parameters (e.g., antenna arrangement, transmission power, etc.). For example, each profile may correspond to a different transmit power value. A first profile may correspond to a first transmit power and a second profile may correspond to a second transmit power. Alternatively, the profiles may correspond to a range of transmit power values. The base station 105-*b* may identify a transmit power and select a corresponding profile from the set of profiles based at least in part on the identified transmit power. For example, the base station 105-*b* may identify its transmit power is the first transmit power and select the first profile.

At 315, the base station 105-*b* may transmit a profile indication to the UE 115-*b*. In some examples, the profile indication may indicate to the UE 115-*b* the profile selected at 310. The profile indication may be transmitted via system information (e.g., RMSI, OSI, or PBCH) or RRC signaling. In some example, the profile may be indicated in two to three bits. In some examples, the bits may point to a location on the lookup table if the set of profiles are arranged in the lookup table, as described above. For example, the bits may include an index which specifies a row or column associated with the selected profile (e.g., the communication procedure and measurement configuration).

At 320, the base station 105-*b* may transmit one or more downlink signals to the UE 115-*b*. The one or more downlink signals may include signals of an SSB. For example, the signals may include an SSS, a PSS, a PBCH, or a DMRS.

At 325, the UE 115-*b* may measure the one or more downlink signals received at 320 and determine a signal strength value associated with the one or more downlink signals. For example, the UE 115-*b* may calculate an RSRP value or an RSSI value of the one or more downlink signals. Additionally or alternatively, the UE 115-*b* may determine channel transmission type, format, or subset of preambles (e.g., PRACH transmission type, format, or subset of preambles). Additionally or alternatively, if the UE 115-*b* has established an RRC connection with the base station 105-*b*, the UE 115-*b* may determine a number of beam failures.

At 330, the UE 115-*b* may modify a communication procedure based on the selected profile. As described above, the profile may indicate the communication procedure and a downlink measurement configuration. In some example, the communication procedure may be a RACH procedure. In such example, the profile may indicate measurement criteria for triggering PRACH repetition. For example, the profile may include a signal strength threshold associated with the one or more downlink signals received at 320. If the signal strength values determined at 325 do not satisfy the signal strength threshold, the UE 115-*b* may trigger PRACH repetitions over multiple RACH occasions. Additionally or alternatively, the profile may indicate a relationship between a PRACH channel transmission type, a PRACH transmission format, or preamble subset and a monitoring procedure. In such example, the UE 115-*b* may determine a set of resources to monitor for DCI scheduling a random access response based on the profile.

Additionally or alternatively, the UE 115-*b* may update a communication procedure which occurs after RACH while the UE 115-*b* is RRC connected. For example, the UE 115-*a* may trigger PUCCH repetition or a BFR procedure based on measurement criteria (e.g., signal strength threshold or a number of beam failures) indicated in the profile.

At 335, the UE 115-*b* may communication with the base station 105-*b* according to the modified communication procedure if the conditions of the measurement configuration indicated in the selected profile are met. Alternatively, at 340, the UE 115-*a* may communicate with the base station 105-*b* via the original communication procedure (e.g., initial RACH procedure) if the conditions of the measurement configuration indicated in the profile are not met. As such, the UE 115-*b* may take into account base station communication parameters when modifying a communication procedure for coverage enhancement.

Figure 4:
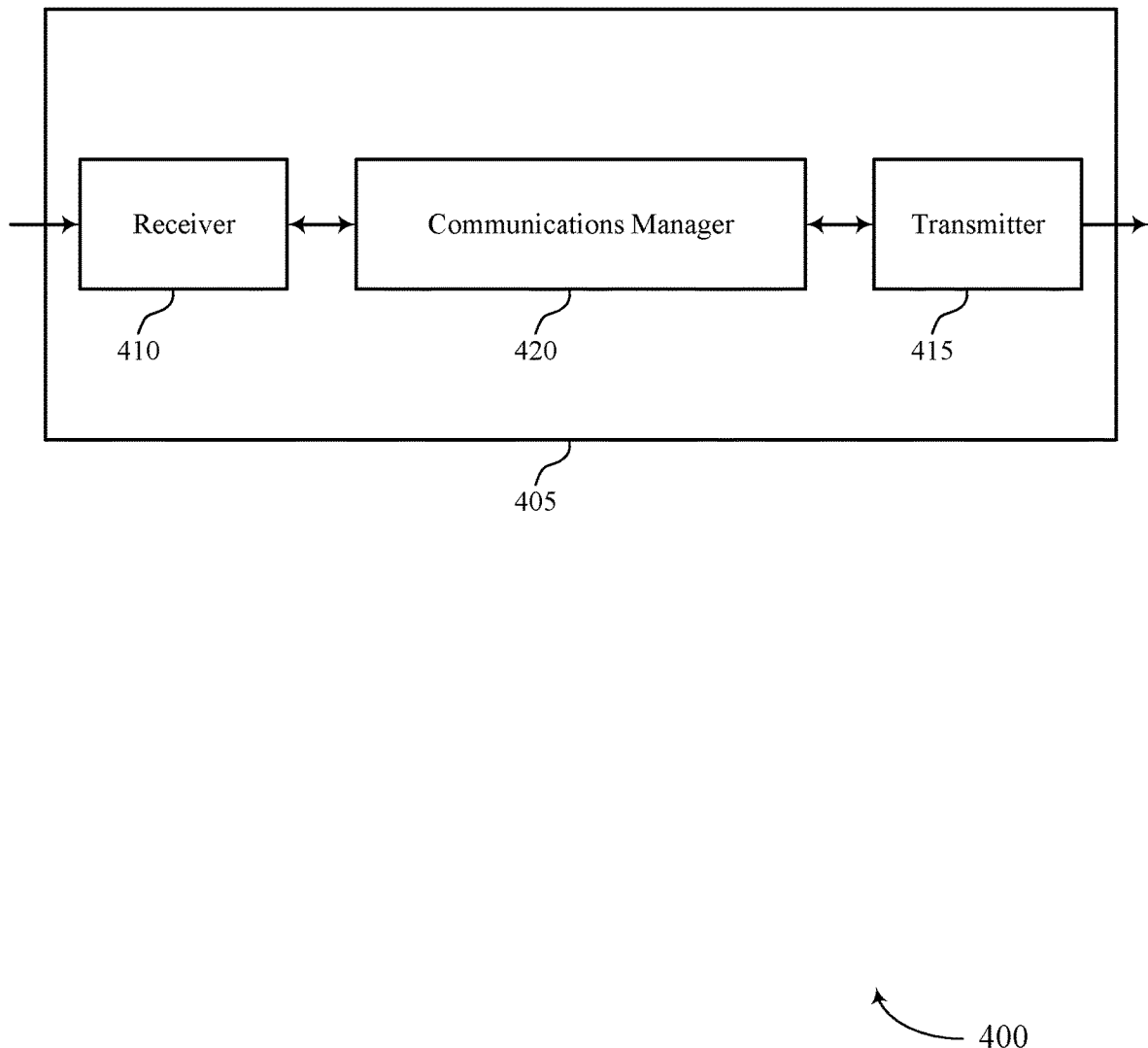
FIGS. 4 and 5 show block diagrams of devices that support techniques for adapting communication procedures based on device characteristics in accordance with aspects of the present disclosure.

FIG. 4 shows a block diagram 400 of a device 405 that supports techniques for adapting communication procedures based on device characteristics in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for adapting communication procedures based on device characteristics). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for adapting communication procedures based on device characteristics). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for adapting communication procedures based on device characteristics as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, an indication of a profile based on one or more communication parameters of the base station, the profile indicating a communication procedure between the UE and the base station and a downlink measurement configuration for modification of the communication procedure for coverage enhancement at the UE. The communications manager 420 may be configured as or otherwise support a means for measuring one or more downlink signals from the base station, the one or more downlink signals indicated by the downlink measurement configuration. The communications manager 420 may be configured as or otherwise support a means for modifying the communication procedure based on measurements of the one or more downlink signals satisfying a threshold indicated by the downlink measurement configuration. The communications manager 420 may be configured as or otherwise support a means for communicating with the base station according to the modified communication procedure for coverage enhancement at the UE based on the modifying.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient use of communication resources. For example, by utilizing a profile based on communication parameters of a base station, the device 405 may accurately determine whether coverage enhancement techniques may be beneficial or advantageous for communications by the device 405. This may reduce the amount of devices 405 which utilize coverage enhancement techniques resulting in a more efficient use of resources when compared to traditional techniques. In addition, the techniques disclosed herein may decrease overhead signaling associated with relaying communication parameters to the device 405 thereby decreasing power consumption related to processing the excess signaling.

Figure 5:
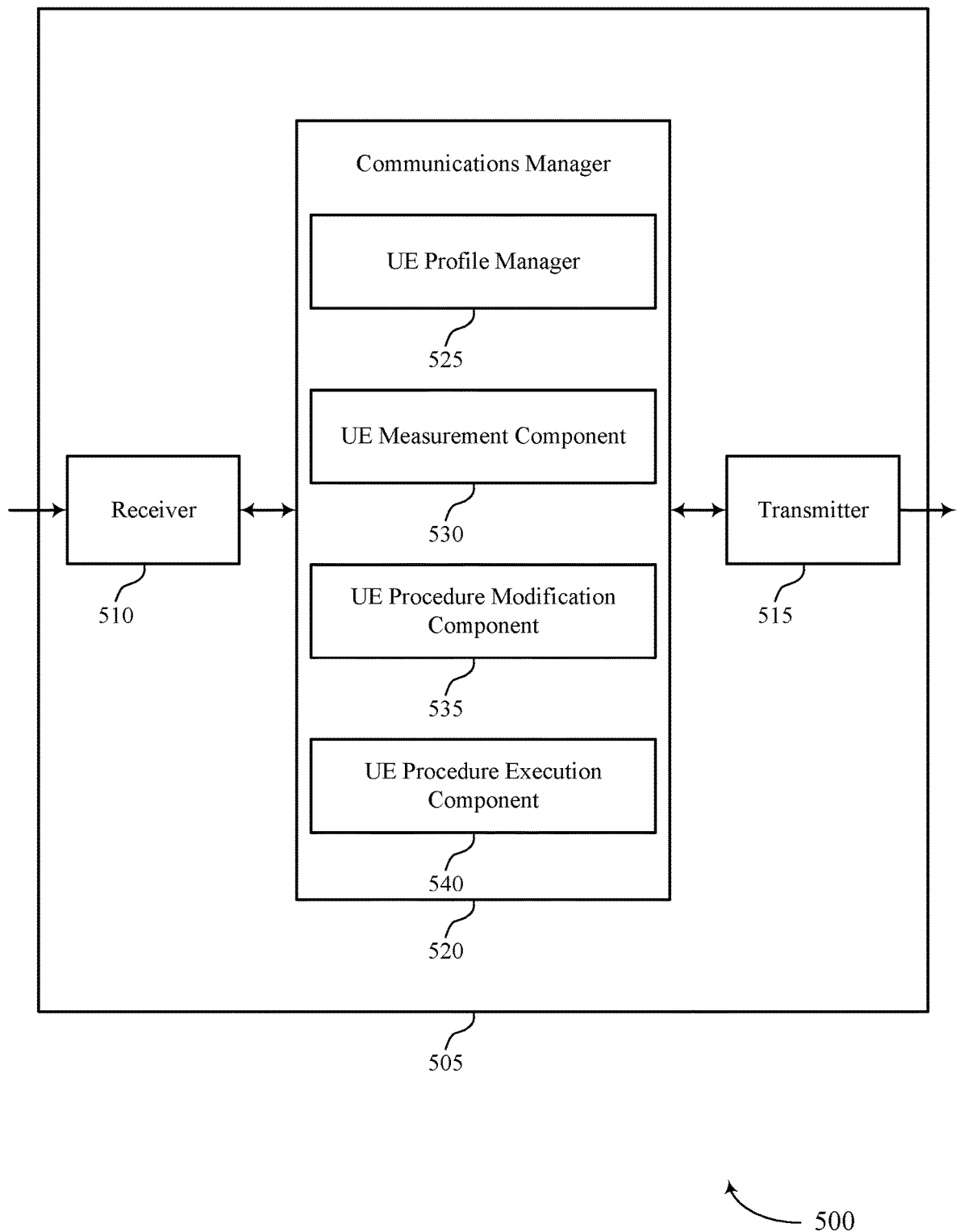

FIG. 5 shows a block diagram 500 of a device 505 that supports techniques for adapting communication procedures based on device characteristics in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for adapting communication procedures based on device characteristics). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for adapting communication procedures based on device characteristics). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for adapting communication procedures based on device characteristics as described herein. For example, the communications manager 520 may include a UE profile manager 525, a UE measurement component 530, a UE procedure modification component 535, a UE procedure execution component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The UE profile manager 525 may be configured as or otherwise support a means for receiving, from a base station, an indication of a profile based on one or more communication parameters of the base station, the profile indicating a communication procedure between the UE and the base station and a downlink measurement configuration for modification of the communication procedure for coverage enhancement at the UE. The UE measurement component 530 may be configured as or otherwise support a means for measuring one or more downlink signals from the base station, the one or more downlink signals indicated by the downlink measurement configuration. The UE procedure modification component 535 may be configured as or otherwise support a means for modifying the communication procedure based on measurements of the one or more downlink signals satisfying a threshold indicated by the downlink measurement configuration. The UE procedure execution component 540 may be configured as or otherwise support a means for communicating with the base station according to the modified communication procedure for coverage enhancement at the UE based on the modifying.

Figure 6:
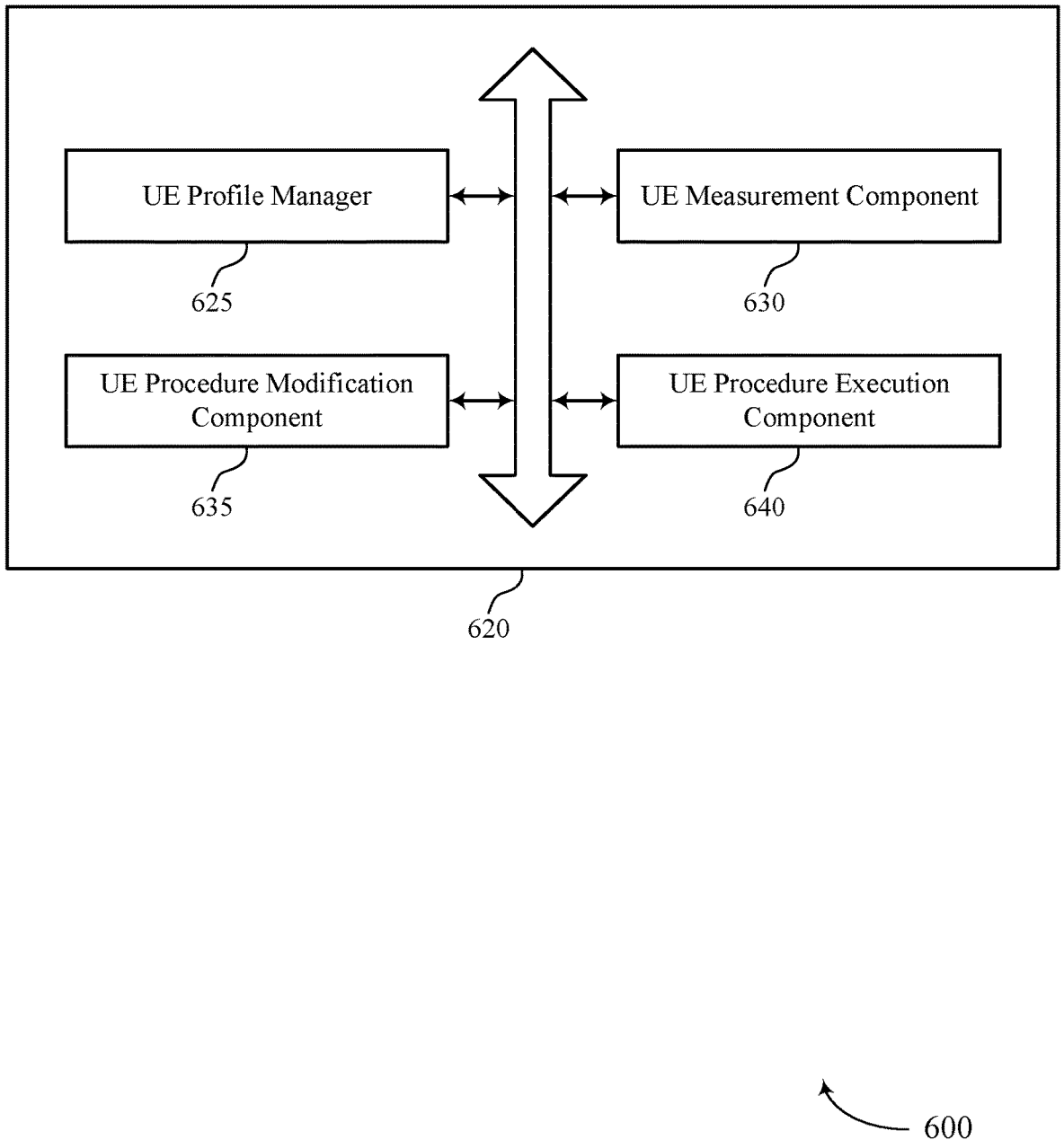
FIG. 6 shows a block diagram of a communications manager that supports techniques for adapting communication procedures based on device characteristics in accordance with aspects of the present disclosure.

FIG. 6 shows a block diagram 600 of a communications manager 620 that supports techniques for adapting communication procedures based on device characteristics in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for adapting communication procedures based on device characteristics as described herein. For example, the communications manager 620 may include a UE profile manager 625, a UE measurement component 630, a UE procedure modification component 635, a UE procedure execution component 640, or any combination thereof. Each of these components may communicate, directly or indirectly, with one another (e.g., via one or more buses).

The communications manager 620 may support wireless communications at a UE in accordance with examples as disclosed herein. The UE profile manager 625 may be configured as or otherwise support a means for receiving, from a base station, an indication of a profile based on one or more communication parameters of the base station, the profile indicating a communication procedure between the UE and the base station and a downlink measurement configuration for modification of the communication procedure for coverage enhancement at the UE. The UE measurement component 630 may be configured as or otherwise support a means for measuring one or more downlink signals from the base station, the one or more downlink signals indicated by the downlink measurement configuration. The UE procedure modification component 635 may be configured as or otherwise support a means for modifying the communication procedure based on measurements of the one or more downlink signals satisfying a threshold indicated by the downlink measurement configuration. The UE procedure execution component 640 may be configured as or otherwise support a means for communicating with the base station according to the modified communication procedure for coverage enhancement at the UE based on the modifying.

In some examples, to support modifying the communication procedure, the UE procedure modification component 635 may be configured as or otherwise support a means for modifying a random access procedure based on the measurements of the one or more downlink signals satisfying the threshold indicated by the downlink measurement configuration.

In some examples, the measurement configuration indicates one or more signals of an SSB to measure and signal threshold associated with the one or more signals of the SSB, and the UE measurement component 630 may be configured as or otherwise support a means for measuring the one or more signals of the SSB indicated by the downlink measurement configuration. In some examples, the measurement configuration indicates one or more signals of an SSB to measure and signal threshold associated with the one or more signals of the SSB, and the UE procedure modification component 635 may be configured as or otherwise support a means for determining that measurements of the one or more signals of the SSB satisfies the signal threshold indicated by the downlink measurement configuration. In some examples, the measurement configuration indicates one or more signals of an SSB to measure and signal threshold associated with the one or more signals of the SSB, and the UE procedure execution component 640 may be configured as or otherwise support a means for transmitting, to the base station, one or more repetitions of a RACH over a set of random access occasions based on the measurements of the one or more signals of the SSB satisfying the signal threshold.

In some examples, the measurement configuration indicates a RACH type, a RACH format, or a RACH preamble subset, and the UE measurement component 630 may be configured as or otherwise support a means for transmitting, to the base station, one or more uplink signals over a physical RACH according to the RACH type, the RACH format, or the RACH preamble subset indicated by the downlink measurement configuration. In some examples, the measurement configuration indicates a RACH type, a RACH format, or a RACH preamble subset, and the UE procedure modification component 635 may be configured as or otherwise support a means for determining a set of resources for monitoring for a downlink control message that schedules a random access response message based on an association between the RACH type, the RACH format, or the RACH preamble subset indicated by the downlink measurement configuration and the set of resources. In some examples, the measurement configuration indicates RACH type, a RACH format, or a RACH preamble subset, and the UE procedure execution component 640 may be configured as or otherwise support a means for monitoring the set of resources for the downlink control message.

In some examples, the downlink measurement configuration includes measurement criteria for activating an uplink control repetition procedure, and the UE procedure modification component 635 may be configured as or otherwise support a means for determining that the measurement criteria is satisfied. In some examples, the downlink measurement configuration includes measurement criteria for activating an uplink control repetition procedure, and the UE procedure modification component 635 may be configured as or otherwise support a means for activating the uplink control repetition procedure based on determining that the measurement criteria is satisfied. In some examples, the downlink measurement configuration includes measurement criteria for activating an uplink control repetition procedure, and the UE procedure execution component 640 may be configured as or otherwise support a means for transmitting, to the base station, one or more repetitions of a PUCCH according to the uplink control repetition procedure.

In some examples, the downlink measurement configuration indicates a threshold number of beam failures for triggering a BFR procedure, and the UE procedure modification component 635 may be configured as or otherwise support a means for determining that a number of beam failures at the UE exceeds the threshold number of beam failures indicated by the downlink measurement configuration. In some examples, the downlink measurement configuration indicates a threshold number of beam failures for triggering a BFR procedure, and the UE procedure execution component 640 may be configured as or otherwise support a means for transmitting, to the base station, a BFR request as part of the BFR procedure based on the number of beam failures at the UE exceeding the threshold number of beam failures.

In some examples, to support receiving the indication of the profile, the UE profile manager 625 may be configured as or otherwise support a means for receiving the indication of the profile via RMSI, OSI, a PBCH, an RRC message, or a combination thereof.

In some examples, the UE profile manager 625 may be configured as or otherwise support a means for receiving, from the base station, a control message configuring the UE with a set of multiple profiles including the profile.

In some examples, the communication procedure includes a random access procedure, an initial access procedure, a re-establishment procedure, or a handover procedure.

In some examples, the downlink measurement configuration indicates the one or more downlink signals for measurement by the UE, a signal threshold associated with the one or more downlink signals, a channel type, a channel format, or a channel preamble subset.

In some examples, the one or more communication parameters includes an antenna arrangement, a transmission power, a mobility, a velocity, or a combination thereof associated with the base station.

Figure 7:
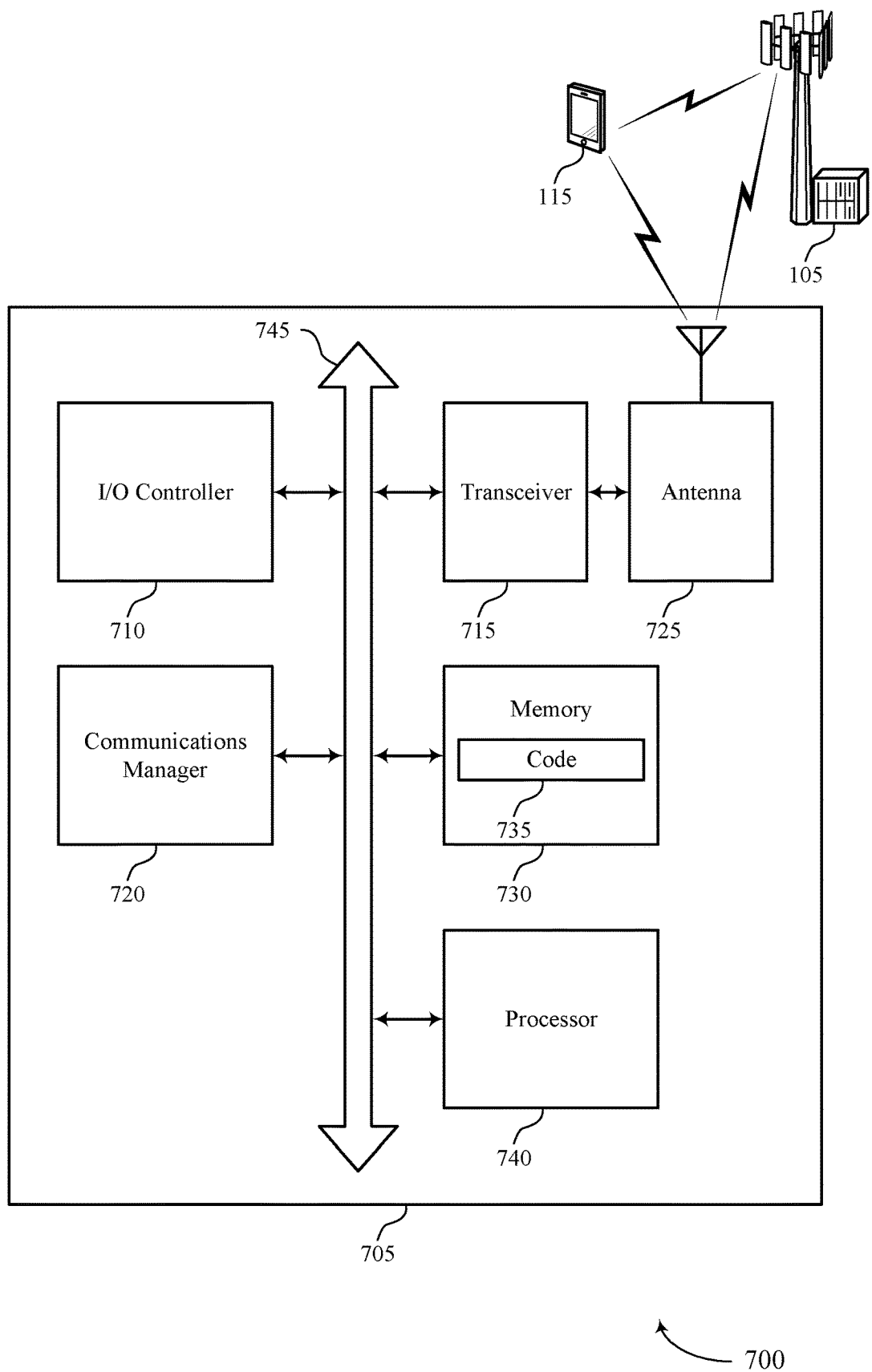
FIG. 7 shows a diagram of a system including a device that supports techniques for adapting communication procedures based on device characteristics in accordance with aspects of the present disclosure.

FIG. 7 shows a diagram of a system 700 including a device 705 that supports techniques for adapting communication procedures based on device characteristics in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for adapting communication procedures based on device characteristics). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, an indication of a profile based on one or more communication parameters of the base station, the profile indicating a communication procedure between the UE and the base station and a downlink measurement configuration for modification of the communication procedure for coverage enhancement at the UE. The communications manager 720 may be configured as or otherwise support a means for measuring one or more downlink signals from the base station, the one or more downlink signals indicated by the downlink measurement configuration. The communications manager 720 may be configured as or otherwise support a means for modifying the communication procedure based on measurements of the one or more downlink signals satisfying a threshold indicated by the downlink measurement configuration. The communications manager 720 may be configured as or otherwise support a means for communicating with the base station according to the modified communication procedure for coverage enhancement at the UE based on the modifying.

By including or configuring the communications manager 720 in accordance with examples as described herein, the device 705 may support techniques for more efficient use of resources and improved communication reliability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for adapting communication procedures based on device characteristics as described herein, or the processor 740 and the memory 730 may be otherwise configured to perform or support such operations.

Figure 8:
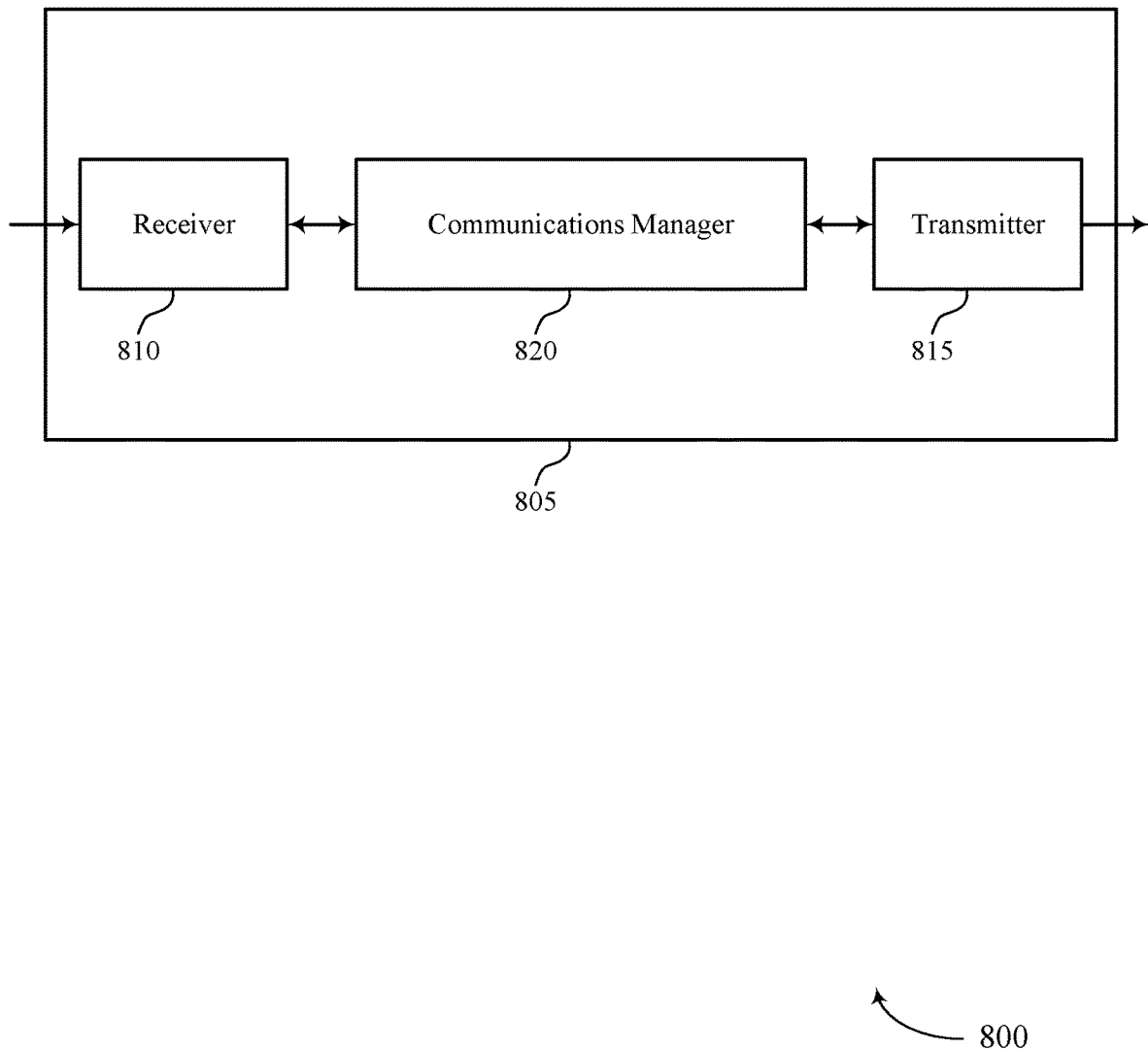
FIGS. 8 and 9 show block diagrams of devices that support techniques for adapting communication procedures based on device characteristics in accordance with aspects of the present disclosure.

FIG. 8 shows a block diagram 800 of a device 805 that supports techniques for adapting communication procedures based on device characteristics in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for adapting communication procedures based on device characteristics). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for adapting communication procedures based on device characteristics). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for adapting communication procedures based on device characteristics as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for selecting, based on one or more communication parameters associated with the base station, a profile from a set of multiple profiles, the profile indicating a communication procedure between a UE and the base station and a downlink measurement configuration for modification of the communication procedure for coverage enhancement at the UE. The communications manager 820 may be configured as or otherwise support a means for transmitting, based on selecting the profile, an indication of the profile to the UE, the indication of the profile instructing the UE to modify the communication procedure based on the downlink measurement configuration. The communications manager 820 may be configured as or otherwise support a means for communicating with the UE according to the modified communication procedure based on one or more measurements at the UE satisfying a threshold indicated by the downlink measurement configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and more efficient utilization of communication resources.

Figure 9:
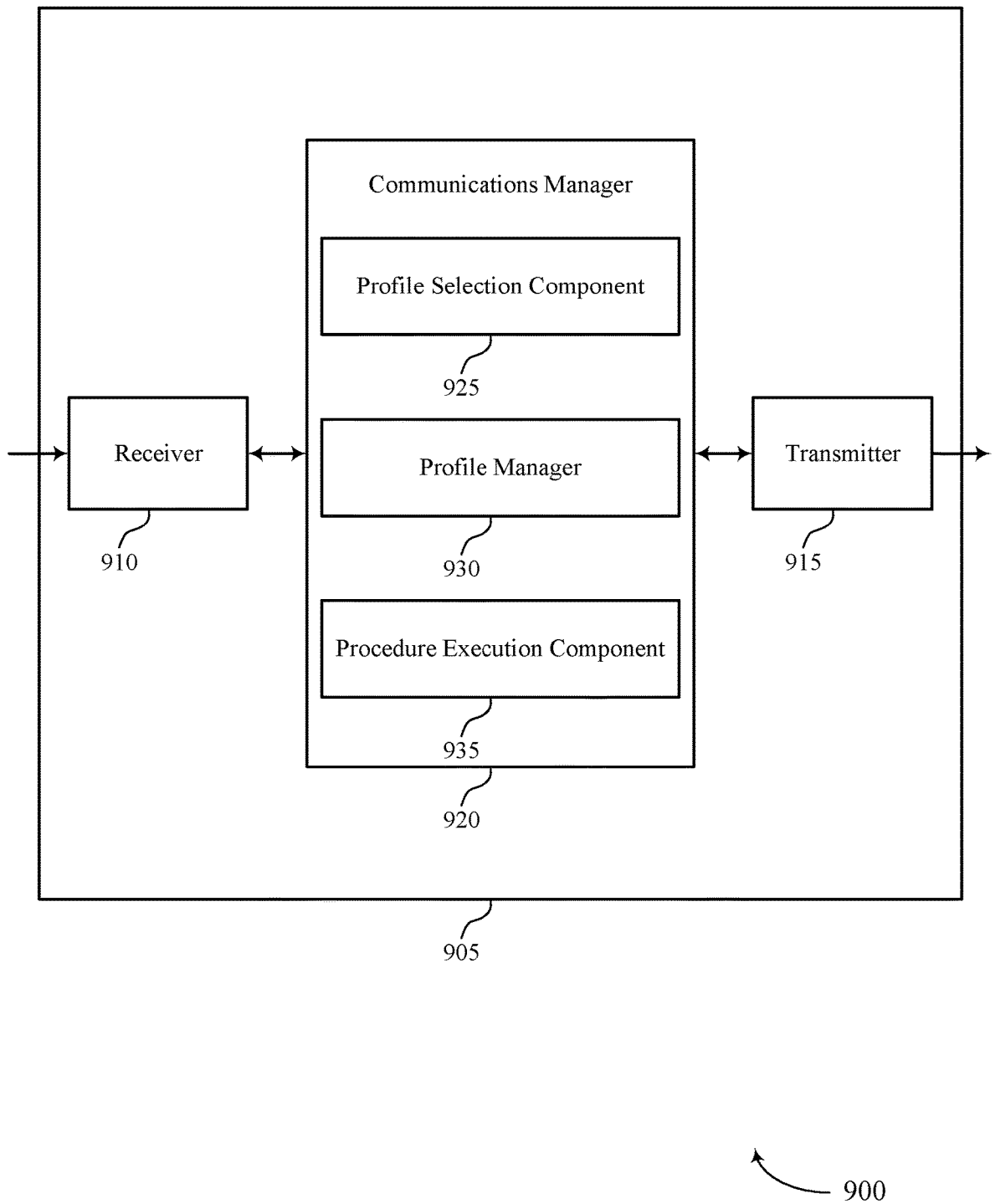

FIG. 9 shows a block diagram 900 of a device 905 that supports techniques for adapting communication procedures based on device characteristics in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for adapting communication procedures based on device characteristics). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for adapting communication procedures based on device characteristics). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for adapting communication procedures based on device characteristics as described herein. For example, the communications manager 920 may include a profile selection component 925, a profile manager 930, a procedure execution component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The profile selection component 925 may be configured as or otherwise support a means for selecting, based on one or more communication parameters associated with the base station, a profile from a set of multiple profiles, the profile indicating a communication procedure between a UE and the base station and a downlink measurement configuration for modification of the communication procedure for coverage enhancement at the UE. The profile manager 930 may be configured as or otherwise support a means for transmitting, based on selecting the profile, an indication of the profile to the UE, the indication of the profile instructing the UE to modify the communication procedure based on the downlink measurement configuration. The procedure execution component 935 may be configured as or otherwise support a means for communicating with the UE according to the modified communication procedure based on one or more measurements at the UE satisfying a threshold indicated by the downlink measurement configuration.

Figure 10:
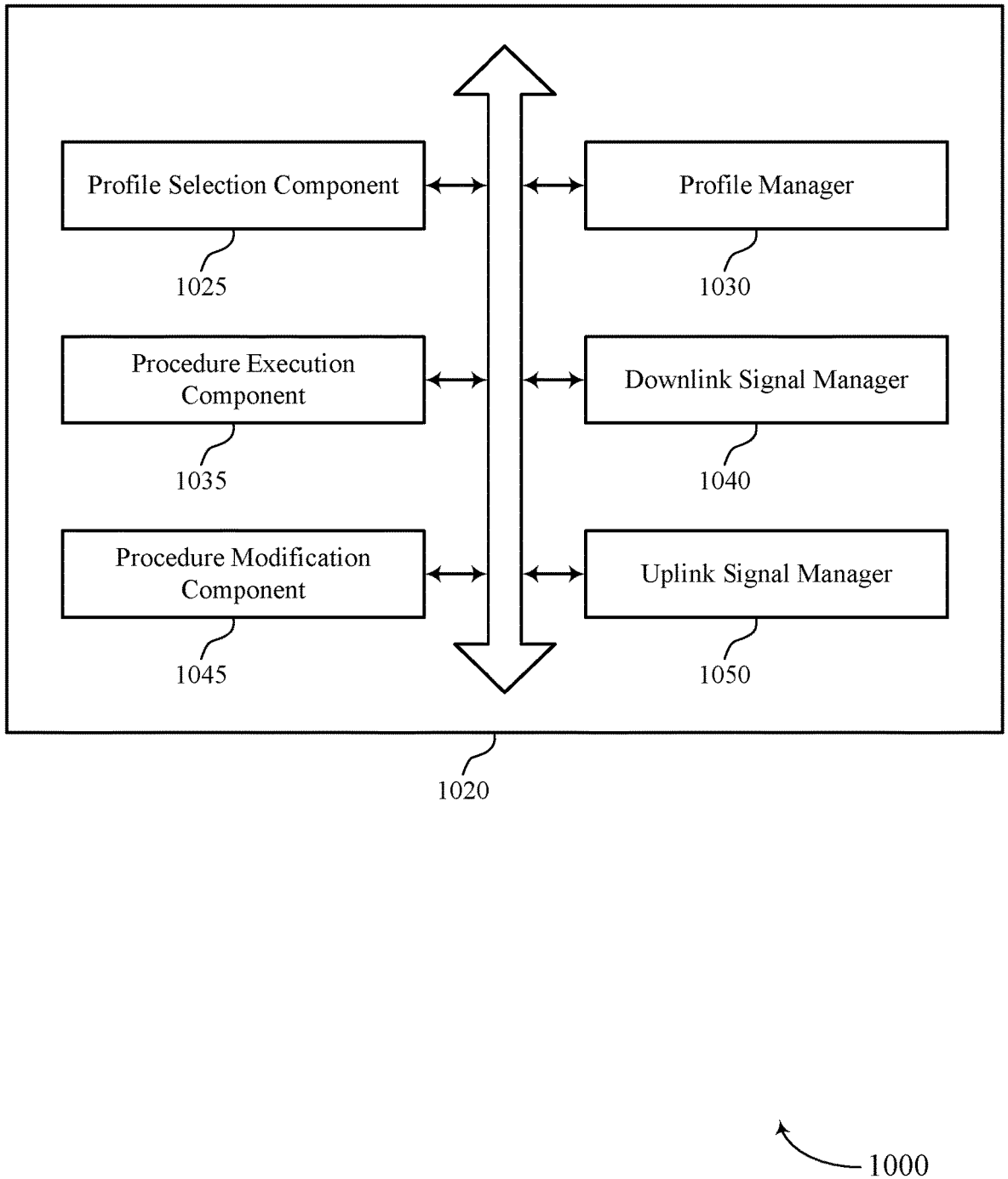
FIG. 10 shows a block diagram of a communications manager that supports techniques for adapting communication procedures based on device characteristics in accordance with aspects of the present disclosure.

FIG. 10 shows a block diagram 1000 of a communications manager 1020 that supports techniques for adapting communication procedures based on device characteristics in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for adapting communication procedures based on device characteristics as described herein. For example, the communications manager 1020 may include a profile selection component 1025, a profile manager 1030, a procedure execution component 1035, a downlink signal manager 1040, a procedure modification component 1045, an uplink signal manager 1050, or any combination thereof. Each of these components may communicate, directly or indirectly, with one another (e.g., via one or more buses).

The communications manager 1020 may support wireless communications at a base station in accordance with examples as disclosed herein. The profile selection component 1025 may be configured as or otherwise support a means for selecting, based on one or more communication parameters associated with the base station, a profile from a set of multiple profiles, the profile indicating a communication procedure between a UE and the base station and a downlink measurement configuration for modification of the communication procedure for coverage enhancement at the UE. The profile manager 1030 may be configured as or otherwise support a means for transmitting, based on selecting the profile, an indication of the profile to the UE, the indication of the profile instructing the UE to modify the communication procedure based on the downlink measurement configuration. The procedure execution component 1035 may be configured as or otherwise support a means for communicating with the UE according to the modified communication procedure based on one or more measurements at the UE satisfying a threshold indicated by the downlink measurement configuration.

In some examples, to support transmitting the indication, the profile manager 1030 may be configured as or otherwise support a means for transmitting the indication of the profile to the UE, the indication of the profile instructing the UE to modify a random access procedure based on the downlink measurement configuration and in accordance with the profile.

In some examples, the downlink measurement configuration indicates one or more signals of an SSB to measure and a signal threshold associated with the one or more signals of the SSB, and the downlink signal manager 1040 may be configured as or otherwise support a means for transmitting, to the UE, one or more signals of the SSB. In some examples, the downlink measurement configuration indicates one or more signals of an SSB to measure and a signal threshold associated with the one or more signals of the SSB, and the procedure modification component 1045 may be configured as or otherwise support a means for monitoring for a set of RACHs including a RACH repetition over a set of multiple RACH occasions based on the profile, where monitoring includes monitoring a first number of symbols for one or more RACH signals based on the modified communication procedure, the first number of symbols different from a second number of symbols associated with the communication procedure.

In some examples, the downlink measurement configuration indicates a RACH type, and the uplink signal manager 1050 may be configured as or otherwise support a means for receiving, from the UE, one or more uplink signals over a physical RACH according to the RACH type, the RACH format, or the RACH preamble subset indicated by the downlink measurement configuration. In some examples, the downlink measurement configuration indicates a RACH type, and the procedure modification component 1045 may be configured as or otherwise support a means for determining a set of resources for downlink control information that schedules a random access response based on an association between the RACH type, the RACH format, or the RACH preamble subset indicated by the downlink measurement configuration and the set of resources. In some examples, the downlink measurement configuration indicates a RACH type, and the procedure execution component 1035 may be configured as or otherwise support a means for transmitting, to the UE, downlink control information over the set of resources.

In some examples, the downlink measurement configuration indicates measurement criteria for activating an uplink control repetition procedure, and the procedure execution component 1035 may be configured as or otherwise support a means for monitoring for one or more repetitions of a PUCCH according to the uplink control repetition procedure.

In some examples, the downlink measurement configuration indicates a threshold number of beam failures for triggering a BFR procedure, and the procedure execution component 1035 may be configured as or otherwise support a means for monitoring for a BFR request according to the BFR procedure.

In some examples, to support transmitting the indication of the profile, the profile manager 1030 may be configured as or otherwise support a means for transmitting the indication of the profile via RMSI, OSI, a PBCH, an RRC message, or a combination thereof.

In some examples, the profile manager 1030 may be configured as or otherwise support a means for transmitting, to the UE, a control message configuring the UE with the set of multiple profiles including the profile.

In some examples, the communication procedure includes a random access procedure, an initial access procedure, a re-establishment procedure, or a handover procedure.

In some examples, the downlink measurement configuration indicates one or more downlink signals for measurement by the UE, a signal threshold associated with the one or more downlink signals, a channel type, a channel format, or a channel preamble subset.

In some examples, the one or more communication parameters includes an antenna arrangement, a transmission power, a mobility, a velocity, or a combination thereof associated with the base station.

Figure 11:
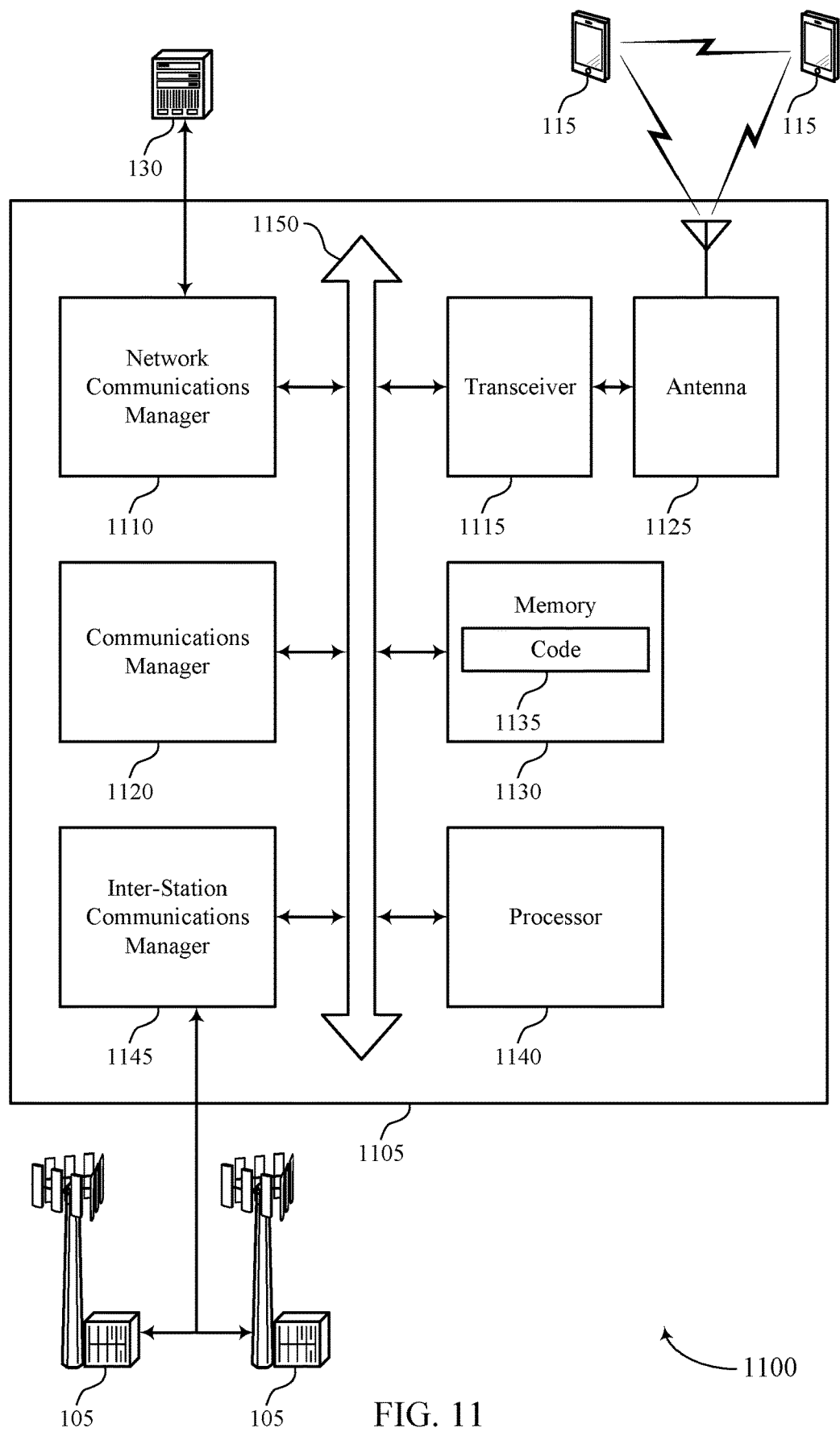
FIG. 11 shows a diagram of a system including a device that supports techniques for adapting communication procedures based on device characteristics in accordance with aspects of the present disclosure.

FIG. 11 shows a diagram of a system 1100 including a device 1105 that supports techniques for adapting communication procedures based on device characteristics in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for adapting communication procedures based on device characteristics). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for selecting, based on one or more communication parameters associated with the base station, a profile from a set of multiple profiles, the profile indicating a communication procedure between a UE and the base station and a downlink measurement configuration for modification of the communication procedure for coverage enhancement at the UE. The communications manager 1120 may be configured as or otherwise support a means for transmitting, based on selecting the profile, an indication of the profile to the UE, the indication of the profile instructing the UE to modify the communication procedure based on the downlink measurement configuration. The communications manager 1120 may be configured as or otherwise support a means for communicating with the UE according to the modified communication procedure based on one or more measurements at the UE satisfying a threshold indicated by the downlink measurement configuration.

By including or configuring the communications manager 1120 in accordance with examples as described herein, the device 1105 may support techniques for improved communication reliability and more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for adapting communication procedures based on device characteristics as described herein, or the processor 1140 and the memory 1130 may be otherwise configured to perform or support such operations.

Figure 12:
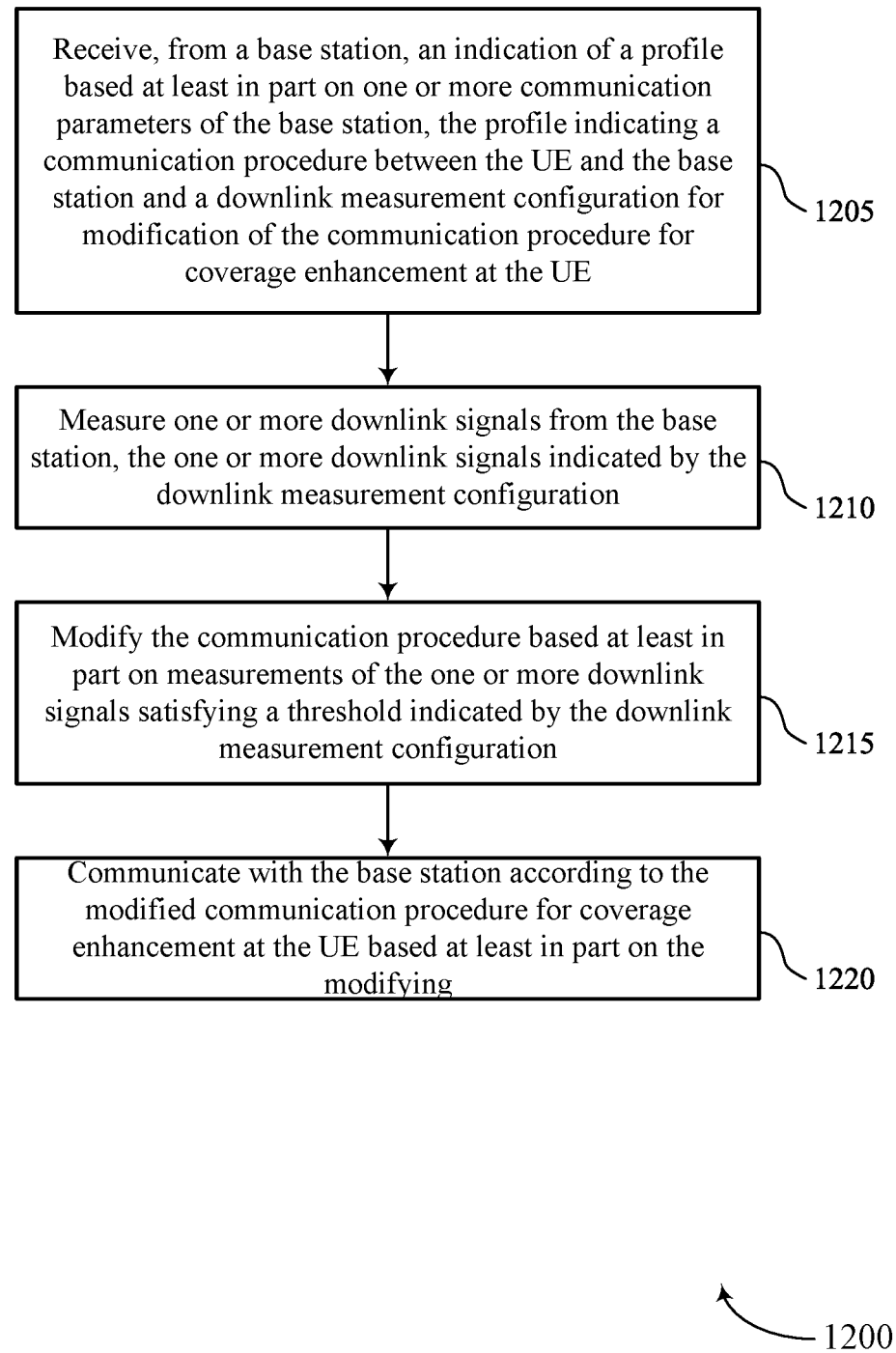
FIGS. 12 through 15 show flowcharts illustrating methods that support techniques for adapting communication procedures based on device characteristics in accordance with aspects of the present disclosure.

FIG. 12 shows a flowchart illustrating a method 1200 that supports techniques for adapting communication procedures based on device characteristics in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a profile based on one or more communication parameters of the base station, the profile indicating a communication procedure between the UE and the base station and a downlink measurement configuration for modification of the communication procedure for coverage enhancement at the UE. The operations of 1205 may be performed in accordance with examples as disclosed herein. In some examples, aspects of the operations of 1205 may be performed by a UE profile manager 625 as described with reference to FIG. 6.

At 1210, the method may include measuring one or more downlink signals from the base station, the one or more downlink signals indicated by the downlink measurement configuration. The operations of 1210 may be performed in accordance with examples as disclosed herein. In some examples, aspects of the operations of 1210 may be performed by a UE measurement component 630 as described with reference to FIG. 6.

At 1215, the method may include modifying the communication procedure based on measurements of the one or more downlink signals satisfying a threshold indicated by the downlink measurement configuration. The operations of 1215 may be performed in accordance with examples as disclosed herein. In some examples, aspects of the operations of 1215 may be performed by a UE procedure modification component 635 as described with reference to FIG. 6.

At 1220, the method may include communicating with the base station according to the modified communication procedure for coverage enhancement at the UE based on the modifying. The operations of 1220 may be performed in accordance with examples as disclosed herein. In some examples, aspects of the operations of 1220 may be performed by a UE procedure execution component 640 as described with reference to FIG. 6.

Figure 13:
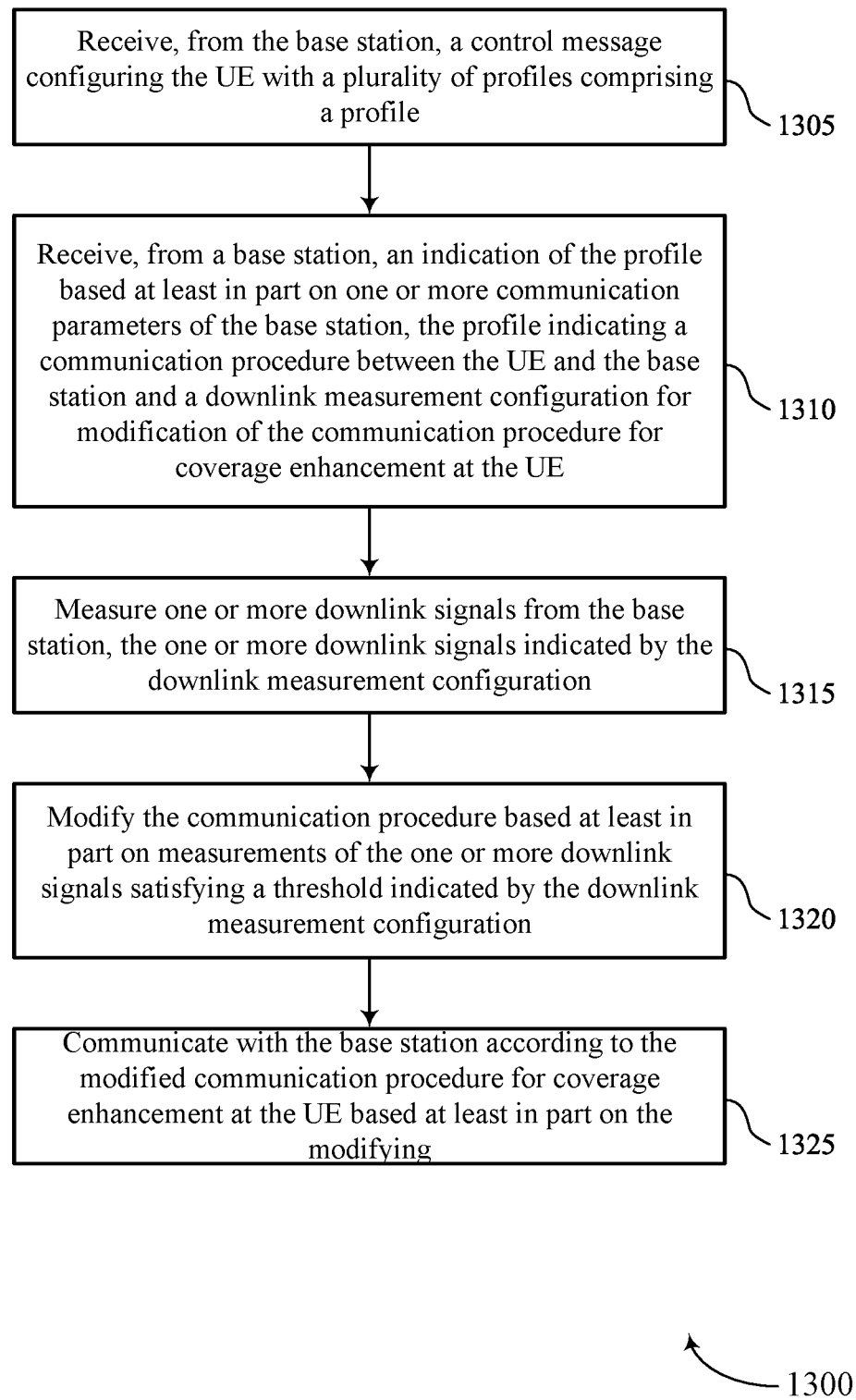

FIG. 13 shows a flowchart illustrating a method 1300 that supports techniques for adapting communication procedures based on device characteristics in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from the base station, a control message configuring the UE with a set of multiple profiles including a profile. The operations of 1305 may be performed in accordance with examples as disclosed herein. In some examples, aspects of the operations of 1305 may be performed by a UE profile manager 625 as described with reference to FIG. 6.

At 1310, the method may include receiving, from a base station, an indication of the profile based on one or more communication parameters of the base station, the profile indicating a communication procedure between the UE and the base station and a downlink measurement configuration for modification of the communication procedure for coverage enhancement at the UE. The operations of 1310 may be performed in accordance with examples as disclosed herein. In some examples, aspects of the operations of 1310 may be performed by a UE profile manager 625 as described with reference to FIG. 6.

At 1315, the method may include measuring one or more downlink signals from the base station, the one or more downlink signals indicated by the downlink measurement configuration. The operations of 1315 may be performed in accordance with examples as disclosed herein. In some examples, aspects of the operations of 1315 may be performed by a UE measurement component 630 as described with reference to FIG. 6.

At 1320, the method may include modifying the communication procedure based on measurements of the one or more downlink signals satisfying a threshold indicated by the downlink measurement configuration. The operations of 1320 may be performed in accordance with examples as disclosed herein. In some examples, aspects of the operations of 1320 may be performed by a UE procedure modification component 635 as described with reference to FIG. 6.

At 1325, the method may include communicating with the base station according to the modified communication procedure for coverage enhancement at the UE based on the modifying. The operations of 1325 may be performed in accordance with examples as disclosed herein. In some examples, aspects of the operations of 1325 may be performed by a UE procedure execution component 640 as described with reference to FIG. 6.

Figure 14:
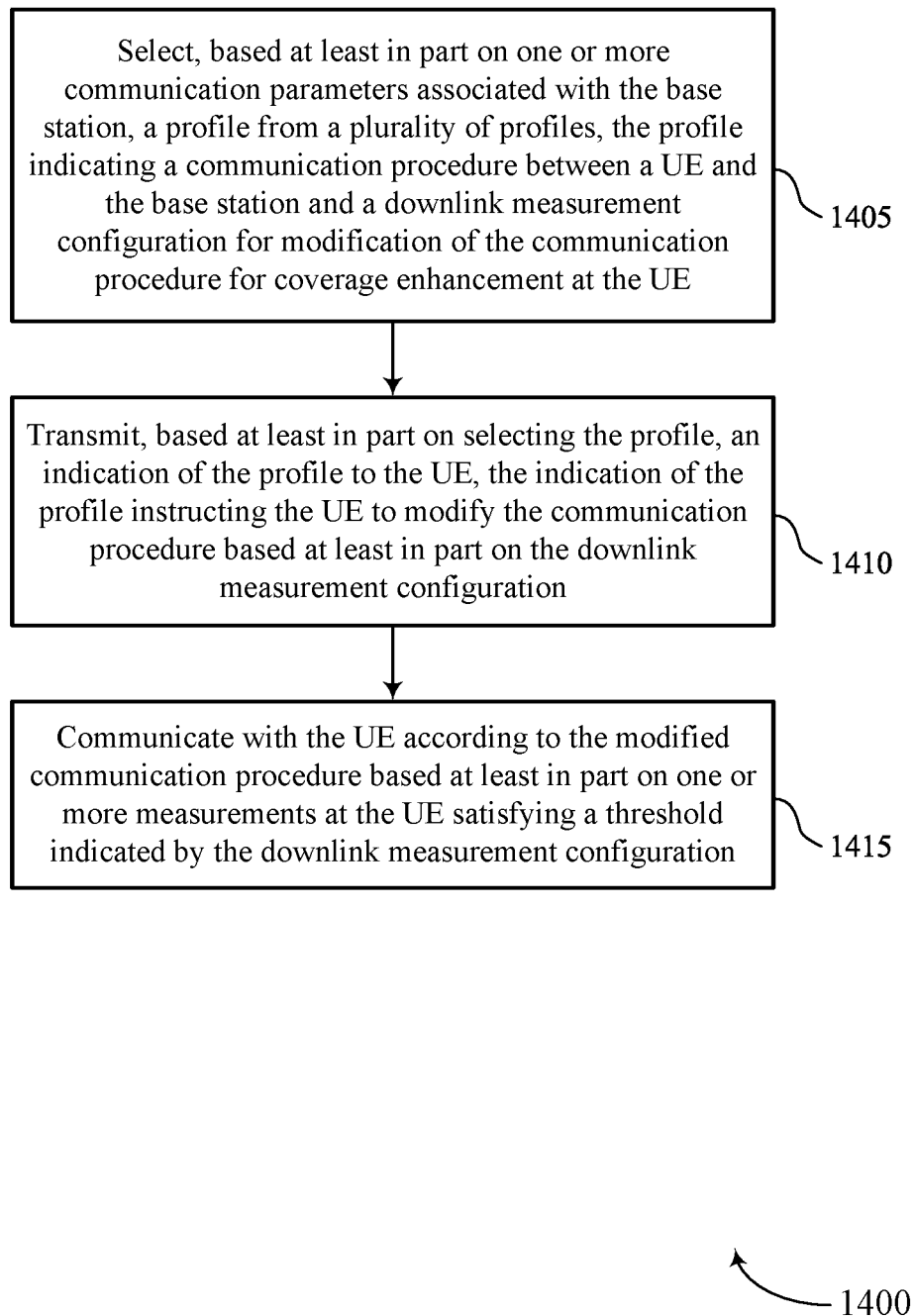

FIG. 14 shows a flowchart illustrating a method 1400 that supports techniques for adapting communication procedures based on device characteristics in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include selecting, based on one or more communication parameters associated with the base station, a profile from a set of multiple profiles, the profile indicating a communication procedure between a UE and the base station and a downlink measurement configuration for modification of the communication procedure for coverage enhancement at the UE. The operations of 1405 may be performed in accordance with examples as disclosed herein. In some examples, aspects of the operations of 1405 may be performed by a profile selection component 1025 as described with reference to FIG. 10.

At 1410, the method may include transmitting, based on selecting the profile, an indication of the profile to the UE, the indication of the profile instructing the UE to modify the communication procedure based on the downlink measurement configuration. The operations of 1410 may be performed in accordance with examples as disclosed herein. In some examples, aspects of the operations of 1410 may be performed by a profile manager 1030 as described with reference to FIG. 10.

At 1415, the method may include communicating with the UE according to the modified communication procedure based on one or more measurements at the UE satisfying a threshold indicated by the downlink measurement configuration. The operations of 1415 may be performed in accordance with examples as disclosed herein. In some examples, aspects of the operations of 1415 may be performed by a procedure execution component 1035 as described with reference to FIG. 10.

Figure 15:
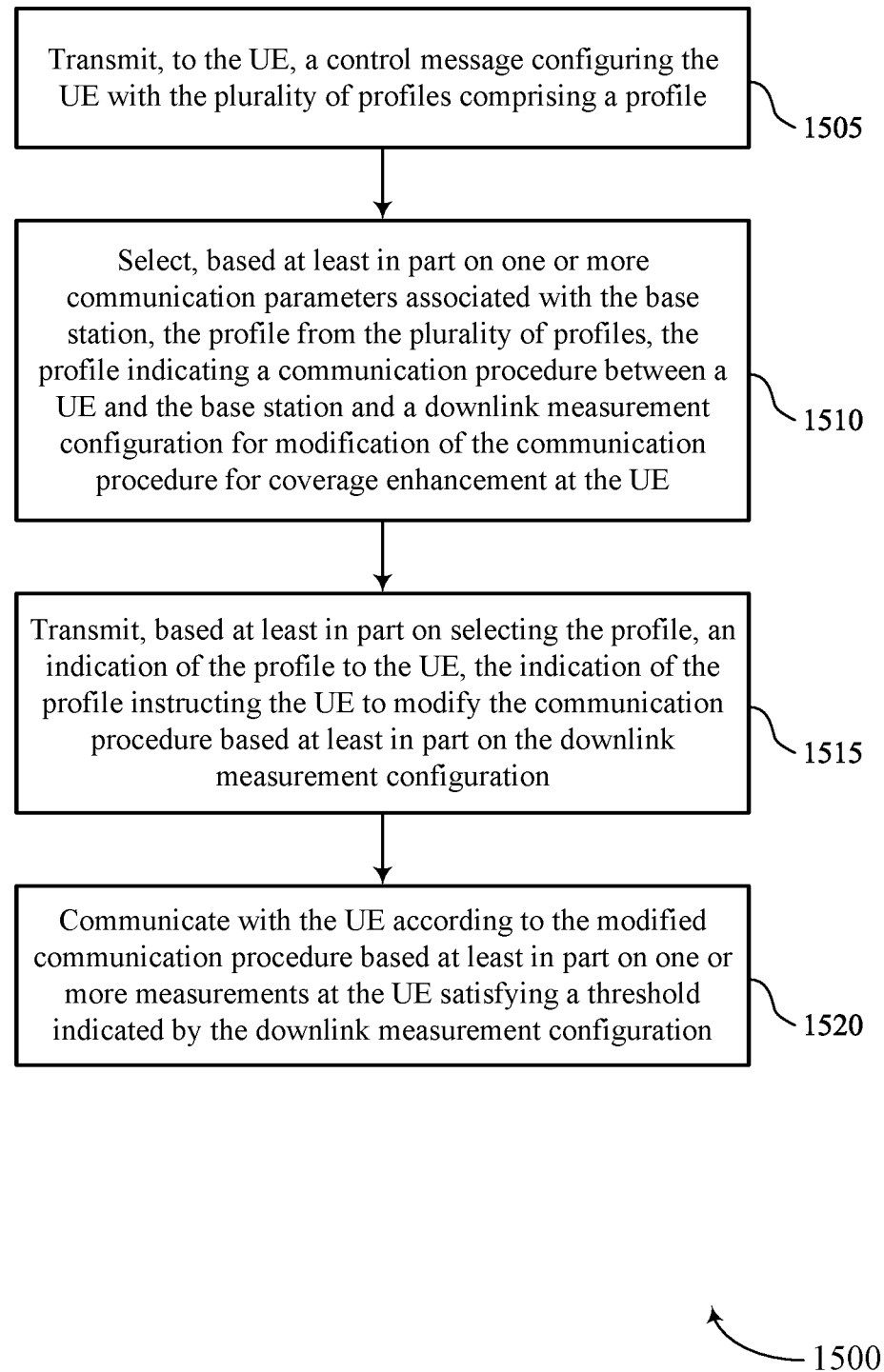

FIG. 15 shows a flowchart illustrating a method 1500 that supports techniques for adapting communication procedures based on device characteristics in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to the UE, a control message configuring the UE with the set of multiple profiles including a profile. The operations of 1505 may be performed in accordance with examples as disclosed herein. In some examples, aspects of the operations of 1505 may be performed by a profile manager 1030 as described with reference to FIG. 10.

At 1510, the method may include selecting, based on one or more communication parameters associated with the base station, the profile from the set of multiple profiles, the profile indicating a communication procedure between a UE and the base station and a downlink measurement configuration for modification of the communication procedure for coverage enhancement at the UE. The operations of 1510 may be performed in accordance with examples as disclosed herein. In some examples, aspects of the operations of 1510 may be performed by a profile selection component 1025 as described with reference to FIG. 10.

At 1515, the method may include transmitting, based on selecting the profile, an indication of the profile to the UE, the indication of the profile instructing the UE to modify the communication procedure based on the downlink measurement configuration. The operations of 1515 may be performed in accordance with examples as disclosed herein. In some examples, aspects of the operations of 1515 may be performed by a profile manager 1030 as described with reference to FIG. 10.

At 1520, the method may include communicating with the UE according to the modified communication procedure based on one or more measurements at the UE satisfying a threshold indicated by the downlink measurement configuration. The operations of 1520 may be performed in accordance with examples as disclosed herein. In some examples, aspects of the operations of 1520 may be performed by a procedure execution component 1035 as described with reference to FIG. 10.

The following provides an overview of aspects of the present disclosure:

Aspect 1: A method for wireless communications at a UE, comprising: receiving, from a base station, an indication of a profile based at least in part on one or more communication parameters of the base station, the profile indicating a communication procedure between the UE and the base station and a downlink measurement configuration for modification of the communication procedure for coverage enhancement at the UE; measuring one or more downlink signals from the base station, the one or more downlink signals indicated by the downlink measurement configuration; modifying the communication procedure based at least in part on measurements of the one or more downlink signals satisfying a threshold indicated by the downlink measurement configuration; and communicating with the base station according to the modified communication procedure for coverage enhancement at the UE based at least in part on the modifying.

Aspect 2: The method of aspect 1, wherein modifying the communication procedure comprises: modifying a random access procedure based at least in part on the measurements of the one or more downlink signals satisfying the threshold indicated by the downlink measurement configuration.

Aspect 3: The method of aspect 2, wherein the downlink measurement configuration indicates one or more signals of an SSB to measure and a signal threshold associated with the one or more signals of the SSB, the modifying the random access procedure comprising measuring the one or more signals of the SSB indicated by the downlink measurement configuration; determining that measurements of the one or more signals of the SSB satisfies the signal threshold indicated by the downlink measurement configuration; and transmitting, to the base station, one or more repetitions of a RACH over a set of random access occasions based at least in part on the measurements of the one or more signals of the SSB satisfying the signal threshold.

Aspect 4: The method of any of aspects 2 through 3, wherein the downlink measurement configuration indicates a RACH type, a RACH format, or a RACH preamble subset, the modifying the random access procedure comprising transmitting, to the base station, one or more uplink signals over a physical RACH according to the RACH type, the RACH format, or the RACH preamble subset indicated by the downlink measurement configuration; determining a set of resources for monitoring for a downlink control message that schedules a random access response message based at least in part on an association between the RACH type, the RACH format, or the RACH preamble subset indicated by the downlink measurement configuration and the set of resources; and monitoring the set of resources for the downlink control message.

Aspect 5: The method of aspect 1, wherein the downlink measurement configuration comprises measurement criteria for activating an uplink control repetition procedure, the method further comprising: determining that the measurement criteria is satisfied; activating the uplink control repetition procedure based at least in part on determining that the measurement criteria is satisfied; and transmitting, to the base station, one or more repetitions of a PUCCH according to the uplink control repetition procedure.

Aspect 6: The method of any of aspects 1 and 5, wherein the downlink measurement configuration indicates a threshold number of beam failures for triggering a BFR procedure, the method further comprising: determining that a number of beam failures at the UE exceeds the threshold number of beam failures indicated by the downlink measurement configuration; and transmitting, to the base station, a BFR request as part of the BFR procedure based at least in part on the number of beam failures at the UE exceeding the threshold number of beam failures.

Aspect 7: The method of any of aspects 1 through 6, wherein receiving the indication of the profile comprises: receiving the indication of the profile via RMSI, OSI, a PBCH, an RRC message, or a combination thereof.

Aspect 8: The method of any of aspects 1 through 7, further comprising: receiving, from the base station, a control message configuring the UE with a plurality of profiles comprising the profile.

Aspect 9: The method of any of aspects 1 through 8, wherein the communication procedure comprises a random access procedure, an initial access procedure, a re-establishment procedure, or a handover procedure.

Aspect 10: The method of any of aspects 1 through 9, wherein the downlink measurement configuration indicates the one or more downlink signals for measurement by the UE, a signal threshold associated with the one or more downlink signals, a channel type, a channel format, or a channel preamble subset.

Aspect 11: The method of any of aspects 1 through 10, wherein the one or more communication parameters comprises an antenna arrangement, a transmission power, a mobility, a velocity, or a combination thereof associated with the base station.

Aspect 12: A method for wireless communications at a base station, comprising: selecting, based at least in part on one or more communication parameters associated with the base station, a profile from a plurality of profiles, the profile indicating a communication procedure between a UE and the base station and a downlink measurement configuration for modification of the communication procedure for coverage enhancement at the UE; transmitting, based at least in part on selecting the profile, an indication of the profile to the UE, the indication of the profile instructing the UE to modify the communication procedure based at least in part on the downlink measurement configuration; and communicating with the UE according to the modified communication procedure based at least in part on one or more measurements at the UE satisfying a threshold indicated by the downlink measurement configuration.

Aspect 13: The method of aspect 12, wherein transmitting the indication comprises: transmitting the indication of the profile to the UE, the indication of the profile instructing the UE to modify a random access procedure based at least in part on the downlink measurement configuration and in accordance with the profile.

Aspect 14: The method of aspect 13, wherein the downlink measurement configuration indicates one or more signals of an SSB to measure and a signal threshold associated with the one or more signals of the SSB, the method further comprising: transmitting, to the UE, one or more signals of the SSB; and monitoring for a set of RACHs including a RACH repetition over a plurality of RACH occasions based at least in part on the profile, wherein monitoring comprises monitoring a first number of symbols for one or more RACH signals based at least in part on the modified communication procedure, the first number of symbols different from a second number of symbols associated with the communication procedure.

Aspect 15: The method of any of aspects 13 through 14, wherein the downlink measurement configuration indicates a RACH type, a RACH format, or a RACH preamble subset, the method further comprising: receiving, from the UE, one or more uplink signals over a physical RACH according to the RACH type, the RACH format, or the RACH preamble subset indicated by the downlink measurement configuration; determining a set of resources for downlink control information that schedules a random access response based at least in part on an association between the RACH type, the RACH format, or the RACH preamble subset indicated by the downlink measurement configuration and the set of resources; and transmitting, to the UE, downlink control information over the set of resources.

Aspect 16: The method of aspect 12, wherein the downlink measurement configuration indicates measurement criteria for activating an uplink control repetition procedure, the method further comprising: monitoring for one or more repetitions of a PUCCH according to the uplink control repetition procedure.

Aspect 17: The method of any of aspects 12 and 16, wherein the downlink measurement configuration indicates a threshold number of beam failures for triggering a BFR procedure, the method further comprising: monitoring for a BFR request according to the BFR procedure.

Aspect 18: The method of any of aspects 12 through 17, wherein transmitting the indication of the profile comprises: transmitting the indication of the profile via RMSI, OSI, a PBCH, an RRC message, or a combination thereof.

Aspect 19: The method of any of aspects 12 through 18, further comprising: transmitting, to the UE, a control message configuring the UE with the plurality of profiles comprising the profile.

Aspect 20: The method of any of aspects 12 through 19, wherein the communication procedure comprises a random access procedure, an initial access procedure, a re-establishment procedure, or a handover procedure.

Aspect 21: The method of any of aspects 12 through 20, wherein the downlink measurement configuration indicates one or more downlink signals for measurement by the UE, a signal threshold associated with the one or more downlink signals, a channel type, a channel format, or a channel preamble subset.

Aspect 22: The method of any of aspects 12 through 21, wherein the one or more communication parameters comprises an antenna arrangement, a transmission power, a mobility, a velocity, or a combination thereof associated with the base station.

Aspect 23: An apparatus for wireless communications at a UE, comprising a processor; memory coupled with the processor; and instructions stored in the memory and executable by the processor to cause the apparatus to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a base station, comprising a processor; memory coupled with the processor; and instructions stored in the memory and executable by the processor to cause the apparatus to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, an indication of a profile, wherein the profile is selected from a plurality of profiles based at least in part on one or more communication parameters of the network device, and wherein the profile indicates a communication procedure between the UE and the network device and indicates a downlink measurement configuration for modification of the communication procedure for coverage enhancement at the UE with the network device;
   measuring, based at least in part on the selected profile, one or more downlink signals, the one or more downlink signals indicated by the downlink measurement configuration;
   modifying the communication procedure for coverage enhancement at the UE with the network device based at least in part on measurements of the one or more downlink signals satisfying a threshold indicated by the downlink measurement configuration; and
   communicating with the network device according to the modified communication procedure for coverage enhancement at the UE with the network device based at least in part on the modifying.

2. The method of claim 1, wherein modifying the communication procedure comprises:
   modifying a random access procedure based at least in part on the measurements of the one or more downlink signals satisfying the threshold indicated by the downlink measurement configuration.

3. The method of claim 2, wherein the downlink measurement configuration indicates one or more signals of a synchronization signal block to measure and a signal threshold associated with the one or more signals of the synchronization signal block, the modifying the random access procedure comprising:
   measuring the one or more signals of the synchronization signal block indicated by the downlink measurement configuration;
   determining that measurements of the one or more signals of the synchronization signal block satisfies the signal threshold indicated by the downlink measurement configuration; and
   transmitting, to the network device, one or more repetitions of a random access channel over a set of random access occasions based at least in part on the measurements of the one or more signals of the synchronization signal block satisfying the signal threshold.

4. The method of claim 2, wherein the downlink measurement configuration indicates a random access channel type, a random access channel format, or a random access channel preamble subset, the modifying the random access procedure comprising:
   transmitting, to the network device, one or more uplink signals over a physical random access channel according to the random access channel type, the random access channel format, or the random access channel preamble subset indicated by the downlink measurement configuration;
   determining a set of resources for monitoring for a downlink control message that schedules a random access response message based at least in part on an association between the random access channel type, the random access channel format, or the random access channel preamble subset indicated by the downlink measurement configuration and the set of resources; and
   monitoring the set of resources for the downlink control message.

5. The method of claim 1, wherein the downlink measurement configuration comprises measurement criteria for activating an uplink control repetition procedure, the method further comprising:
  determining that the measurement criteria is satisfied;
  activating the uplink control repetition procedure based at least in part on determining that the measurement criteria is satisfied; and
  transmitting, to the network device, one or more repetitions of a physical uplink control channel according to the uplink control repetition procedure.

6. The method of claim 1, wherein the downlink measurement configuration indicates a threshold number of beam failures for triggering a beam failure recovery procedure, the method further comprising:
  determining that a number of beam failures at the UE exceeds the threshold number of beam failures indicated by the downlink measurement configuration; and
  transmitting, to the network device, a beam failure recovery request as part of the beam failure recovery procedure based at least in part on the number of beam failures at the UE exceeding the threshold number of beam failures.

7. The method of claim 1, wherein receiving the indication of the profile comprises:
  receiving the indication of the profile via remaining minimum system information, other system information, a physical broadcast channel, a radio resource control (RRC) message, or a combination thereof.

8. The method of claim 1, further comprising:
  receiving, from the network device, a control message configuring the UE with a plurality of profiles comprising the profile.

9. The method of claim 1, wherein the communication procedure comprises a random access procedure, an initial access procedure, a re-establishment procedure, or a handover procedure.

10. The method of claim 1, wherein the downlink measurement configuration indicates the one or more downlink signals for measurement by the UE, a signal threshold associated with the one or more downlink signals, a channel type, a channel format, or a channel preamble subset.

11. The method of claim 1, wherein the one or more communication parameters comprises an antenna arrangement, a transmission power, a mobility, a velocity, or a combination thereof associated with the network device.

12. A method for wireless communications at a network device, comprising:
  selecting, based at least in part on one or more communication parameters associated with the network device, a profile from a plurality of profiles, the profile indicating a communication procedure between a user equipment (UE) and the network device and indicating a downlink measurement configuration for modification of the communication procedure for coverage enhancement at the UE with the network device;
  transmitting, based at least in part on selecting the profile, an indication of the profile, the indication of the profile instructing the UE to modify the communication procedure for coverage enhancement at the UE with the network device based at least in part on the downlink measurement configuration; and
  communicating with the UE according to the modified communication procedure based at least in part on one or more measurements at the UE satisfying a threshold indicated by the downlink measurement configuration.

13. The method of claim 12, wherein transmitting the indication comprises:
  transmitting the indication of the profile to the UE, the indication of the profile instructing the UE to modify a random access procedure based at least in part on the downlink measurement configuration and in accordance with the profile.

14. The method of claim 13, wherein the downlink measurement configuration indicates one or more signals of a synchronization signal block to measure and a signal threshold associated with the one or more signals of the synchronization signal block, the method further comprising:
  transmitting, to the UE, one or more signals of the synchronization signal block; and
  monitoring for a set of random access channels including a random access channel repetition over a plurality of random access channel occasions based at least in part on the profile, wherein monitoring comprises monitoring a first number of symbols for one or more random access channel signals based at least in part on the modified communication procedure, the first number of symbols different from a second number of symbols associated with the communication procedure.

15. The method of claim 13, wherein the downlink measurement configuration indicates a random access channel type, a random access channel format, or a random access channel preamble subset, the method further comprising:
  receiving, from the UE, one or more uplink signals over a physical random access channel according to the random access channel type, the random access channel format, or the random access channel preamble subset indicated by the downlink measurement configuration;
  determining a set of resources for downlink control information that schedules a random access response based at least in part on an association between the random access channel type, the random access channel format, or the random access channel preamble subset indicated by the downlink measurement configuration and the set of resources; and
  transmitting, to the UE, downlink control information over the set of resources.

16. The method of claim 12, wherein the downlink measurement configuration indicates measurement criteria for activating an uplink control repetition procedure, the method further comprising:
  monitoring for one or more repetitions of a physical uplink control channel according to the uplink control repetition procedure.

17. The method of claim 12, wherein the downlink measurement configuration indicates a threshold number of beam failures for triggering a beam failure recovery procedure, the method further comprising:
  monitoring for a beam failure recovery request according to the beam failure recovery procedure.

18. The method of claim 12, wherein transmitting the indication of the profile comprises:
  transmitting the indication of the profile via remaining minimum system information, other system information, a physical broadcast channel, a radio resource control (RRC) message, or a combination thereof.

19. The method of claim 12, further comprising:
  transmitting, to the UE, a control message configuring the UE with the plurality of profiles comprising the profile.

20. The method of claim 12, wherein the communication procedure comprises a random access procedure, an initial access procedure, a re-establishment procedure, or a handover procedure.

21. The method of claim 12, wherein the downlink measurement configuration indicates one or more downlink signals for measurement by the UE, a signal threshold associated with the one or more downlink signals, a channel type, a channel format, or a channel preamble subset.

22. The method of claim 12, wherein the one or more communication parameters comprises an antenna arrangement, a transmission power, a mobility, a velocity, or a combination thereof associated with the network device.

23. An apparatus for wireless communications at a user equipment (UE), comprising:
a processor;
memory coupled with the processor; and
instructions stored in the memory and executable by the processor to cause the apparatus to:
receive, from a network device, an indication of a profile, wherein the profile is selected from a plurality of profiles based at least in part on one or more communication parameters of the network device, and wherein the profile indicates a communication procedure between the UE and the network device and indicates a downlink measurement configuration for modification of the communication procedure for coverage enhancement at the UE with the network device;
measure, based at least in part on the selected profile, one or more downlink signals, the one or more downlink signals indicated by the downlink measurement configuration;
modify the communication procedure for coverage enhancement at the UE with the network device based at least in part on measurements of the one or more downlink signals satisfying a threshold indicated by the downlink measurement configuration; and
communicate with the network device according to the modified communication procedure for coverage enhancement at the UE with the network device based at least in part on the modifying.

24. The apparatus of claim 23, wherein the instructions to modify the communication procedure are executable by the processor to cause the apparatus to:
modify a random access procedure based at least in part on the measurements of the one or more downlink signals satisfying the threshold indicated by the downlink measurement configuration.

25. The apparatus of claim 24, wherein the downlink measurement configuration indicates one or more signals of a synchronization signal block to measure and a signal threshold associated with the one or more signals of the synchronization signal block, and the instructions to modify the random access procedure are executable by the processor to cause the apparatus to:
measure the one or more signals of the synchronization signal block indicated by the downlink measurement configuration;
determine that measurements of the one or more signals of the synchronization signal block satisfies the signal threshold indicated by the downlink measurement configuration; and
transmit, to the network device, one or more repetitions of a random access channel over a set of random access occasions based at least in part on the measurements of the one or more signals of the synchronization signal block satisfying the signal threshold.

26. The apparatus of claim 24, wherein the downlink measurement configuration indicates a random access channel type, a random access channel format, or a random access channel preamble subset, and the instructions to modify the random access procedure are executable by the processor to cause the apparatus to:
transmit, to the network device, one or more uplink signals over a physical random access channel according to the random access channel type, the random access channel format, or the random access channel preamble subset indicated by the downlink measurement configuration;
determine a set of resources for monitoring for a downlink control message that schedules a random access response message based at least in part on an association between the random access channel type, the random access channel format, or the random access channel preamble subset indicated by the downlink measurement configuration and the set of resources; and
monitor the set of resources for the downlink control message.

27. The apparatus of claim 23, wherein the instructions are further executable by the processor to cause the apparatus to:
receive, from the network device, a control message configuring the UE with a plurality of profiles comprising the profile.

28. An apparatus for wireless communications at a network device, comprising:
a processor;
memory coupled with the processor; and
instructions stored in the memory and executable by the processor to cause the apparatus to:
select, based at least in part on one or more communication parameters associated with the network device, a profile from a plurality of profiles, the profile indicating a communication procedure between a user equipment (UE) and the network device and indicating a downlink measurement configuration for modification of the communication procedure for coverage enhancement at the UE with the network device;
transmit, based at least in part on selecting the profile, an indication of the profile, the indication of the profile instructing the UE to modify the communication procedure for coverage enhancement at the UE with the network device based at least in part on the downlink measurement configuration; and
communicate with the UE according to the modified communication procedure based at least in part on one or more measurements at the UE satisfying a threshold indicated by the downlink measurement configuration.

29. The apparatus of claim 28, wherein the instructions to transmit the indication are executable by the processor to cause the apparatus to:
transmit the indication of the profile to the UE, the indication of the profile instructing the UE to modify a random access procedure based at least in part on the downlink measurement configuration and in accordance with the profile.

30. The apparatus of claim 28, wherein the instructions are further executable by the processor to cause the apparatus to:

transmit, to the UE, a control message configuring the UE with the plurality of profiles comprising the profile.

* * * * *